(12) United States Patent
Dorn et al.

(10) Patent No.: US 11,879,554 B2
(45) Date of Patent: Jan. 23, 2024

(54) HIGH-PERFORMANCE BUTTERFLY VALVE

(71) Applicant: DeZURIK, Inc., Sartell, MN (US)

(72) Inventors: John B. Dorn, Sauk Rapids, MN (US); Kyle M. Sand, Clearwater, MN (US); Nicholas K. Thorpe, Tacoma, WA (US); Daniel Joseph Towner, Princeton, MN (US)

(73) Assignee: DeZURIK, Inc., Sartell, MN (US)

( * ) Notice: Subject to any disclaimer, the term of this patent is extended or adjusted under 35 U.S.C. 154(b) by 0 days.

(21) Appl. No.: 17/704,286

(22) Filed: Mar. 25, 2022

(65) Prior Publication Data

US 2022/0307608 A1 Sep. 29, 2022

Related U.S. Application Data

(60) Provisional application No. 63/166,832, filed on Mar. 26, 2021.

(51) Int. Cl.
*F16K 1/22* (2006.01)
*F16K 1/48* (2006.01)

(52) U.S. Cl.
CPC . *F16K 1/48* (2013.01); *F16K 1/22* (2013.01)

(58) Field of Classification Search
CPC ............... F16K 1/22; F16K 1/222; F16K 1/48
USPC ........................................................ 251/308
See application file for complete search history.

(56) References Cited

U.S. PATENT DOCUMENTS

| 4,428,395 | A | * | 1/1984 | Bravo | B65D 55/14 |
| | | | | | 137/364 |
| 4,817,916 | A | | 4/1989 | Rawstron | |
| 5,794,647 | A | * | 8/1998 | Denmark | B65G 69/183 |
| | | | | | 137/637.1 |
| 8,348,233 | B2 | | 1/2013 | Kim | |
| 8,348,235 | B2 | | 1/2013 | Higgs | |

FOREIGN PATENT DOCUMENTS

| EP | 1209390 | | 2/2003 | | |
| EP | 2249067 | | 11/2010 | | |
| GB | 2525372 | | 10/2015 | | |
| GB | 2539864 | | 1/2017 | | |
| JP | H10259877 | | 9/1998 | | |
| JP | 2020139583 | A * | 9/2020 | ............ | F16K 1/222 |
| KR | 20170133920 | A * | 12/2017 | | |
| WO | 2019174685 | | 9/2019 | | |

OTHER PUBLICATIONS

Translation of JP2020139583 (Year: 2022).*
Translation of KR20170133920 (Year: 2022).*
"DeZURIK BHP High Performance Butterfly Valves," DeZURIK Sales Bulletin 45.00-1, Jun. 2020 (22 pages).

* cited by examiner

*Primary Examiner* — Kelsey E Cary
(74) *Attorney, Agent, or Firm* — Pauly, DeVries Smith & Deffner LLC

(57) ABSTRACT

A valve design including a valve body comprising an aperture through the body is disclosed. The valve includes a shaft secured to a disc with a clamping connection.

20 Claims, 18 Drawing Sheets

HIGH-PERFORMANCE BUTTERFLY VALVE

This application is a non-provisional application claiming priority to U.S. Provisional Application No. 63/166,832, filed Mar. 26, 2021, and the entire contents are incorporated herein by reference.

FIELD

Embodiments herein relate to valves and valve components, including butterfly valves and components for butterfly valves.

BACKGROUND

Butterfly valves have been available for some time. Butterfly valves include a body having inlet and outlet ports, and a closing member (often called a disc) mounted to a shaft configured to rotate between a closed position perpendicular to the flow and an open position parallel with the flow. A metal or resilient seal is positioned between the closing member and the valve body. A seat is frequently used as a seal between the valve body and the disc to help ensure a more complete stop of the flow when the valve is closed. Butterfly valves can be operated in a position that is neither fully open nor closed, such as in throttling and modulating applications. Butterfly valves handle a wide variety of liquids, gases, and solids, including water, air, petroleum, paint, and chemicals. They are used extensively in applications in the chemical, hydrocarbon processing, pulp & paper, water and wastewater, and HVAC industries worldwide, among others. Butterfly valves typically have a long service life and are light weight, inexpensive, and known for their reliability.

Although butterfly valves are well known, a need remains for improved valves.

SUMMARY

A need exists for butterfly valves where the shaft-to-disc connection and all parts of the shaft within the pressure boundary exceed the strength of the shaft that lies outside of the pressure boundary. This ensures the valve can still be operated by an improvised means in the event the actuator mounted to the shaft outside the pressure boundary is over-torqued due to some reason (stuck valve, etc.) and is no longer able to operate the valve. Thus, it is desirable to have the valve shaft and shaft-to-disc connection constructed such that the external portions of the shaft would fail before the internal portions. This design avoids negative outcomes including catastrophic failure and loss of flow control if the interior portion of the shaft-disc-connection and/or shaft breaks. This design also avoids slippage of the closing member, damage to the shaft, and reduced lifetime of the butterfly valve.

The present application aims to provide an improved manner of mounting a closing member to a shaft of a butterfly valve. A clamp is provided to mount the shaft to a closing member. The clamp and shaft meet at an interface with a unique shape that allows it to secure the shaft and closing member together while efficiently transferring forces from the shaft to the closing member. This configuration increases the longevity and performance of the butterfly valve under a wide range of operating conditions.

An example valve design includes a valve body with an aperture through the body. The aperture provides a path through which fluids can flow. A closing member (also referred to as a disc) is configured to seal the aperture, and the closing member typically has a top face and an indentation in the top face. A shaft extends through the aperture, and the shaft is configured to make a rotational movement about a shaft axis. Typically, the shaft comprises a first engagement surface and a second engagement surface. A clamp mounts and secures the closing member to the shaft. In an example embodiment the clamp comprises an opening or recess having an upper surface and first and second sidewalls. The first and second sidewalls are configured to engage with first and second engagement surfaces of the shaft. In addition, a first leg and a second leg protrude from the lower face of the clamp and are configured to be retained in the indentation in the top face of the closing member.

This summary is an overview of some of the aspects of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Numerous ways of mounting the closing member to the shaft of a butterfly valve are known in the art. However, butterfly valves are often subject to a large range of torques while in operation. Conventional methods of mounting the closing member to the shaft lack the needed strength and durability for a butterfly valve to withstand diverse operating conditions. In particular, there is a need for valves that have a stronger connection inside the valve, including a connection that is stronger than the shaft portion outside the valve that turns the valve. This design of high strength interior components avoids a catastrophic failure of interior elements (the shaft failing or the shaft to disc connection failing) and subsequently the loss of flow control. The present application aims to provide an improved manner of mounting a closing member to a shaft of a butterfly valve. A clamp is provided to mount the shaft to a closing member. The clamp has a unique shape which allows it to efficiently transfer forces form the shaft to a recess in the closing member. Such a configuration increases the longevity and performance of the butterfly valve under a wide range of operating conditions.

The present application aims to provide an improved manner of mounting a closing member to a shaft of a butterfly valve. Embodiments herein provide a clamping assembly. The clamping assembly can include a shaft, a closing member, a clamp, and fasteners. The closing member is mounted to the shaft with the clamp. The shaft is attached to the body of the valve and is configured to make a rotational movement about the shaft axis. The clamp mounts the closing member to the shaft such that the closing member stays rigidly connected to the shaft as the shaft makes the rotational movement about the shaft axis. The clamp can have a clamp opening to engage with at least a portion of the shaft. The clamp can have clamp legs to engage with an indentation in the closing member. The unique configuration of the clamping assembly allows an increased efficiency in force transfer and increased shaft integrity compared to the prior art.

Valve System

Figure 1:
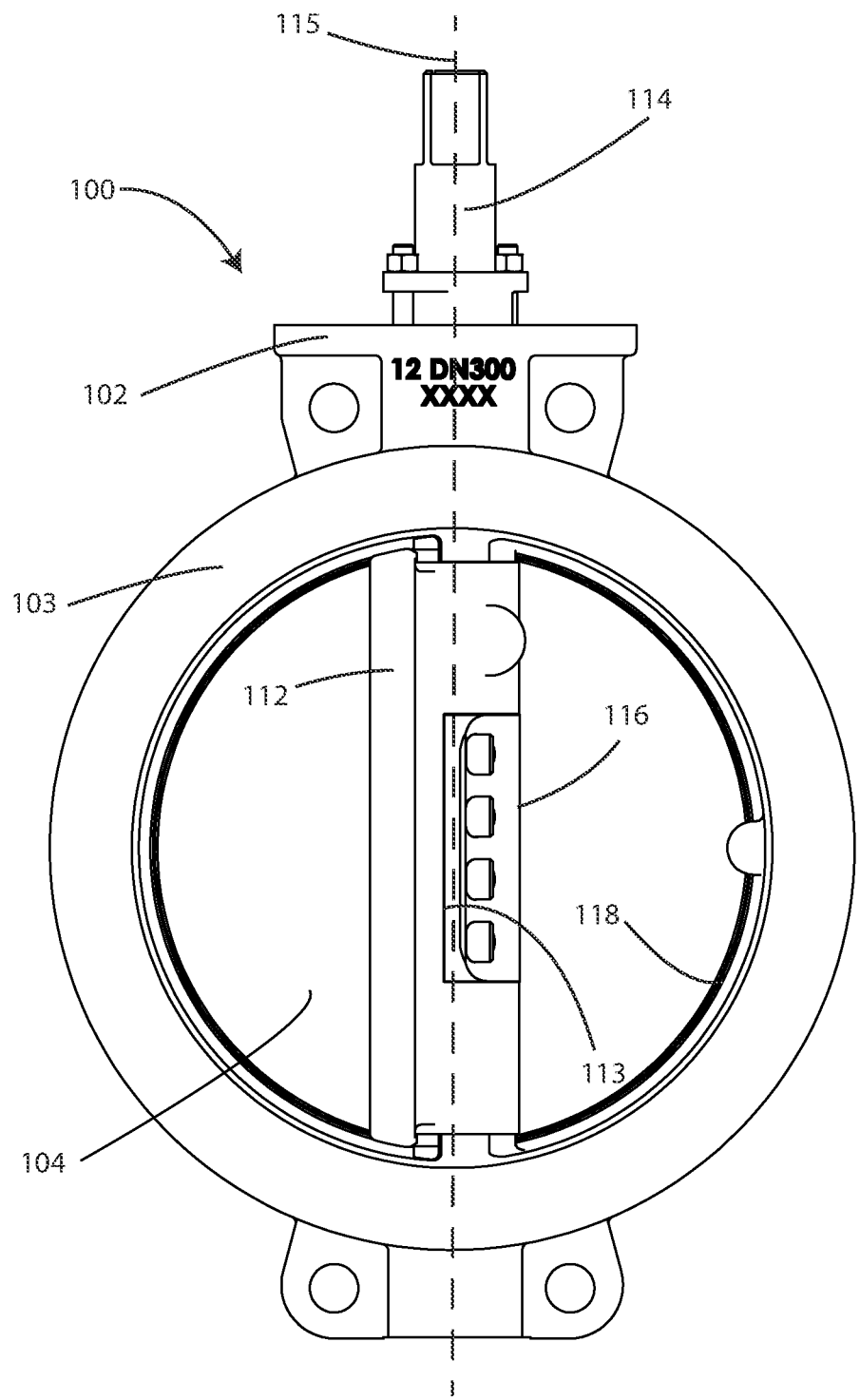
FIG. 1 is a schematic view of a butterfly valve assembly in accordance with various embodiments herein.

Referring now to FIG. 1, a schematic view of a valve 100 is shown in accordance with various embodiments herein. The valve 100 can have a valve body 102 defining an aperture 104. The valve body can be made from a variety of materials including carbon steel, stainless steel, or other materials depending upon the application. In various embodiments, the valve 100 can be mounted in a fluid passageway such that fluids can flow through the aperture 104. In various embodiments, the valve 100 can include a shaft 114 extending through the aperture. The shaft 114 can be attached to the valve body 102 at both ends and configured to make a rotational movement about a shaft axis 115. In some implementations there can be two shafts: an upper shaft and a lower shaft. In various embodiments, a closing member 112 (such as a disc) is mounted to the shaft 114 such that the closing member 112 stays rigidly connected to the shaft 114 as the shaft makes the rotational movement about the shaft axis 115. The closing member 112 can be configured to rotate from an open position in which fluids can flow through the aperture 104 and a closed position in which fluids are blocked from flowing through the aperture by the closing member. In an embodiment, the rotational movement can be a quarter turn of the shaft 114 about the shaft axis 115, but other degrees of rotation are possible.

FIG. 1 depicts the valve 100 with the closing member 112 in the open position. In the open position, the closing member 112 is oriented such that at least a portion of the aperture 104 is open to the flow of fluids. In various embodiments, a closing member top face 113 is at an oblique angle to a front face of the valve body 103. In various embodiments, the closing member top face 113 may have surface curvature or other surface features (and is thus typically not flat or planer). When the valve is open the closing member top face 113 is substantially perpendicular to the front face of the valve body 103.

Figure 2:
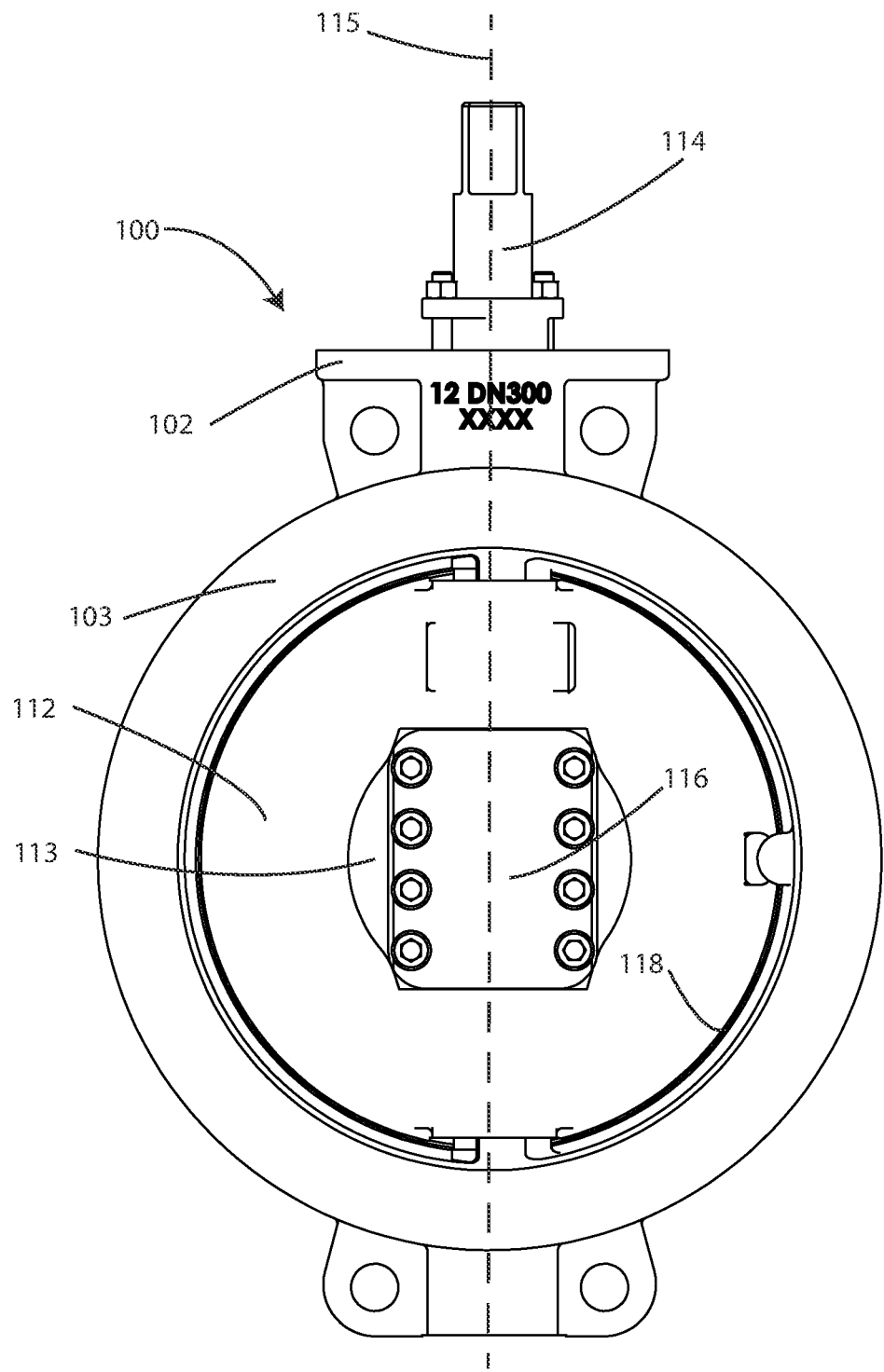
FIG. 2 is a schematic view of a butterfly valve assembly in accordance with various embodiments herein.

FIG. 2 depicts the valve of FIG. 1 with the closing member 112 in the closed position. In various embodiments, the closing member 112 arrives at the closed position by a rotational movement of the shaft 114 by a quarter turn about the shaft axis 115 from the open position. In the closed position, the aperture 104 is blocked by the closing member 112 such that fluids are blocked from flowing through the aperture by the closing member. In various embodiments, the closing member 112 can form a seal with an interior face 118 of the valve 100. In various embodiments the closing member top face 113 is perpendicular to the front face of the valve body 103.

In various embodiments the closing member 112 is mounted to the shaft 114 with a clamp 116. In various embodiments the clamp causes the closing member to stay rigidly connected to the shaft as the shaft makes the rotational movement about shaft axis 115. The closing member 112 is secured to the shaft 114 to by clamp 116 so that it does not slip with respect to the shaft 114 as the shaft makes the rotational movement about shaft axis 115. In an embodiment the closing member 112 flexes less than an eighth of a degree relative to the shaft 114 as the shaft makes the rotational movement about shaft axis 115. In an embodiment the closing member 112 slips less than a quarter of a degree relative to the shaft 114 as the shaft makes the rotational movement about shaft axis 115. In an embodiment the closing member 112 slips less than half a degree relative to the shaft 114 as the shaft makes the rotational movement about shaft axis 115. In an embodiment the closing member 112 slips less than one degree relative to the shaft 114 as the shaft makes the rotational movement about shaft axis 115. In an embodiment the closing member 112 slips less than two degrees relative to the shaft 114 as the shaft makes the rotational movement about shaft axis 115. In an embodiment, the closing member 112 slips less than five degrees relative to the shaft 114 as the shaft makes the rotational movement about shaft axis 115.

Clamping Assembly

Figure 3:
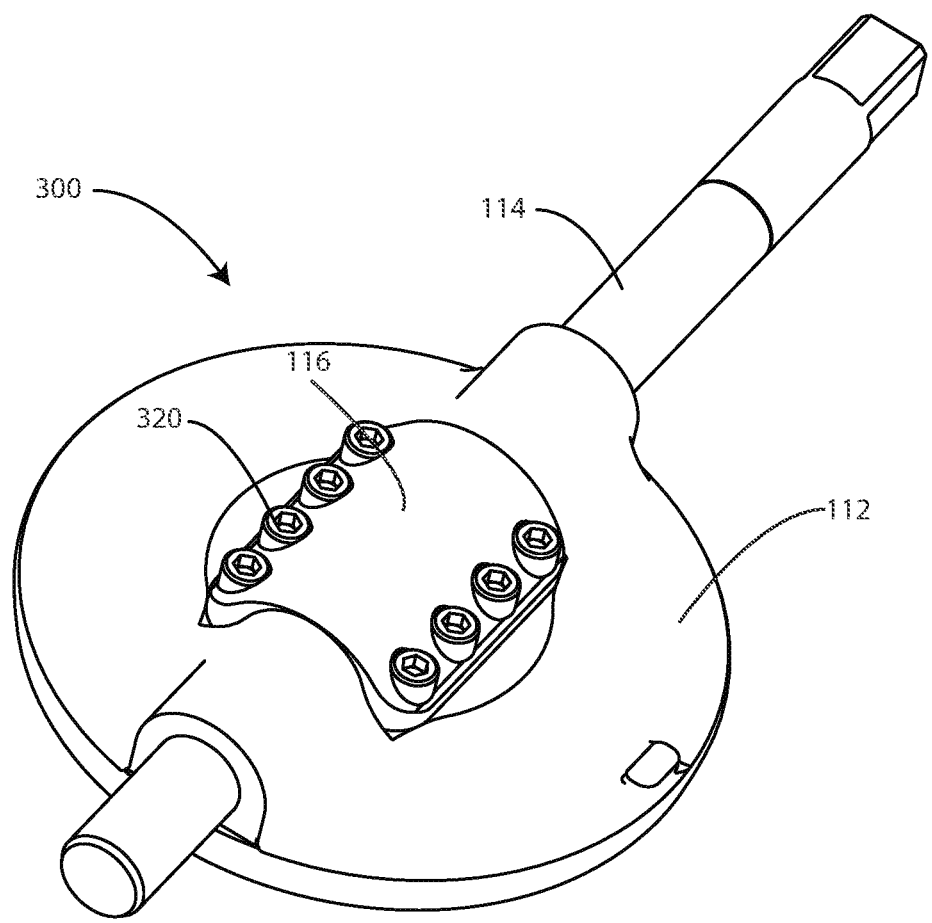
FIG. 3 is a schematic perspective view of a disc, shaft and clamp assembly in accordance with various embodiments herein.

FIGS. 3-11 show clamping assemblies made in accordance with various embodiments herein. FIG. 3 depicts a perspective view of a clamping assembly 300. The clamping assembly 300 can include a shaft 114, a closing member 112, a clamp 116, and fasteners 320. The closing member 112 can be mounted to the shaft 114 with the clamp 116. The shaft 114 is attached to the valve body 102 of a valve 100 and configured to make a rotational movement about a shaft axis 115. The clamp 116 mounts the closing member 112 to the shaft 114 such that the closing member stays rigidly connected to the shaft as the shaft makes the rotational movement about the shaft axis 115.

Figure 4:
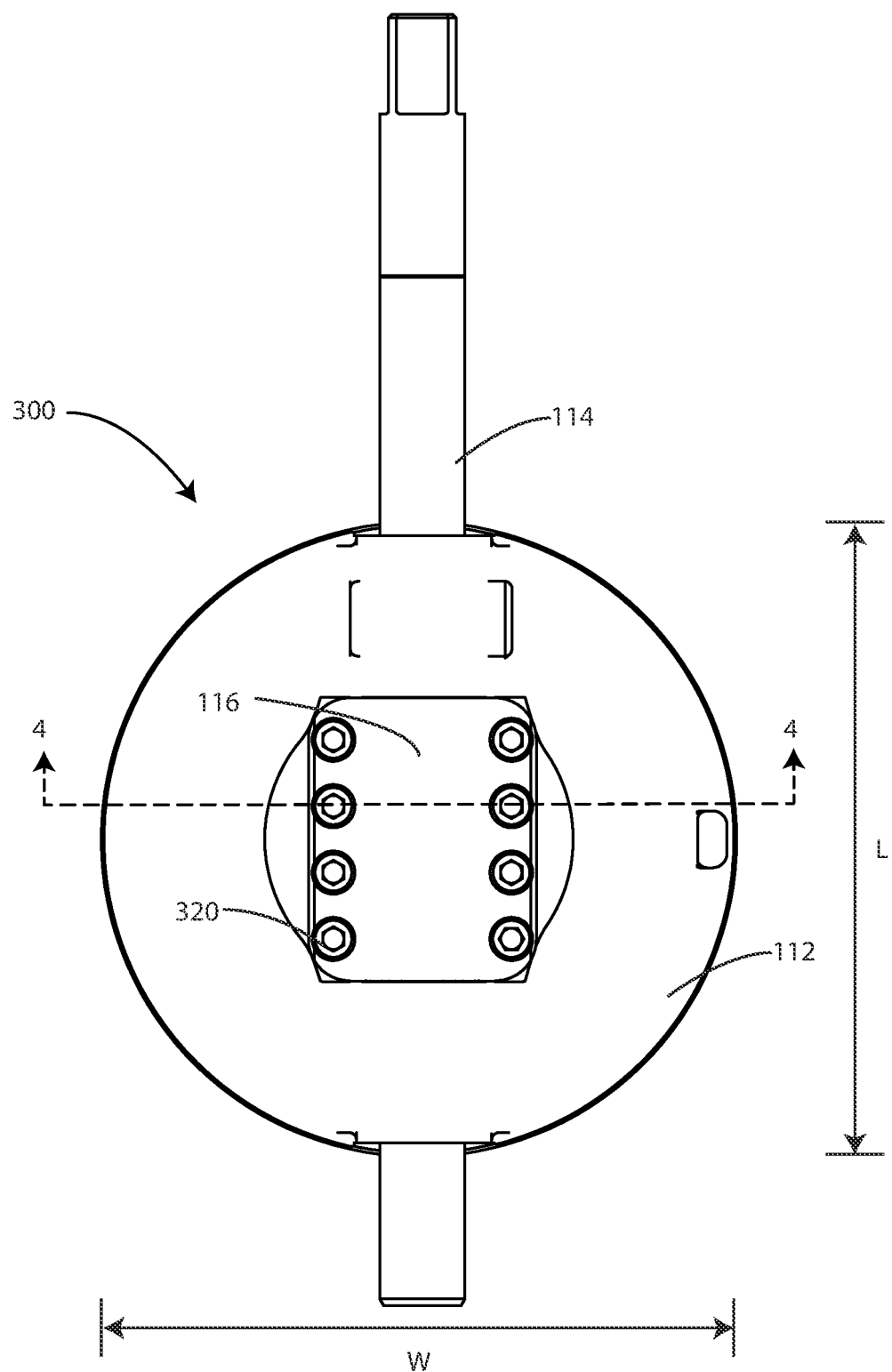
FIG. 4 is a schematic top view of the disc, shaft and clamp assembly of FIG. 3 in accordance with various embodiments herein.

Referring now to FIG. 4, a top view of a clamping assembly is shown in accordance with various embodiments herein. In various embodiments, the clamping assembly 300 can include a shaft 114, a closing member 112, a clamp 116, and fasteners 320.

Referring to FIG. 4, in various embodiments, the clamp 116 does not extend all the way across length L of the closing member 112. In various embodiments, the clamp 116 extends all the way across length L, but in other implementations extends less than 100% across length L; optionally extends less than 90% across length L, or optionally extends less than 80% across length L of the closing member 112. In various embodiments, the clamp 116 extends less than 70% across length L of the closing member 112. In various embodiments, the clamp 116 extends less than 60% across length L of the closing member 112. In various embodiments, the clamp 116 extends less than 50% across length L of the closing member 112. In various embodiments, the clamp 116 extends less than 40% across length L of the closing member 112. In various embodiments, the clamp 116 extends less than 30% across length L of the closing member 112. In various embodiments, the clamp 116 extends less than 20% across length L of the closing member 112. In various embodiments, the clamp 116 extends less than 10% across length L of the closing member 112.

In various embodiments, the clamp 116 extends more than 10% across length L of the closing member 112. In various embodiments, the clamp 116 extends more than 20% across length L of the closing member 112. In various embodiments, the clamp 116 extends more than 30% across length L of the closing member 112. In various embodiments, the clamp 116 extends more than 40% across length L of the closing member 112. In various embodiments, the clamp 116 extends more than 50% across length L of the closing member 112. In various embodiments, the clamp 116 extends more than 60% across length L of the closing member 112. In various embodiments, the clamp 116 extends more than 70% across length L of the closing member 112. In various embodiments, the clamp 116 extends more than 80% across length L of the closing member 112. In various embodiments, the clamp 116 extends more than 90% across length L of the closing member 112. In various embodiments, the clamp 116 extends substantially all the way across length L of the closing member 112.

In various embodiments, the clamp 116 typically extends between 20% and 30% of the way across length L of the closing member 112. In various embodiments, the clamp 116 typically extends between 30% and 40% of the way across length L of the closing member 112. In various embodiments, the clamp 116 typically extends between 40% and 50% of the way across length L of the closing member 112. In various embodiments, the clamp 116 typically extends between 50% and 60% of the way across length L of the closing member 112. In various embodiments, the clamp 116 typically extends between 60% and 70% of the way across length L of the closing member 112.

In various embodiments, the clamp 116 is centered along length L of the closing member 112. In an alternative embodiment, the clamp 116 is not centered along length L of the closing member 112.

In various embodiments, the clamp 116 does not extend all the way across width W of the closing member 112. In various embodiments, the clamp 116 extends less than 80% across width W of the closing member 112. In various embodiments, the clamp 116 extends less than 70% across width W of the closing member 112. In various embodiments, the clamp 116 extends less than 60% across width W of the closing member 112. In various embodiments, the clamp 116 extends less than 50% across width W of the closing member 112. In various embodiments, the clamp 116 extends less than 40% across width W of the closing member 112. In various embodiments, the clamp 116 extends less than 30% across width W of the closing member 112. In various embodiments, the clamp 116 extends less than 20% across width W of the closing member 112. In various embodiments, the clamp 116 extends less than 10% across width W of the closing member 112.

In various embodiments, the clamp 116 extends more than 10% across width W of the closing member 112. In various embodiments, the clamp 116 extends more than 20% across width W of the closing member 112. In various embodiments, the clamp 116 extends more than 30% across width W of the closing member 112. In various embodiments, the clamp 116 extends more than 40% across width W of the closing member 112. In various embodiments, the clamp 116 extends more than 50% across width W of the closing member 112. In various embodiments, the clamp 116 extends more than 60% across width W of the closing member 112. In various embodiments, the clamp 116 extends more than 70% across width W of the closing member 112. In various embodiments, the clamp 116 extends more than 80% across width W of the closing member 112. In various embodiments, the clamp 116 extends more than 90% across width W of the closing member 112. In various embodiments, the clamp 116 extends substantially all the way across width W of the closing member 112.

In various embodiments, the clamp 116 typically extends between 20% and 30% of the way across width W of the closing member 112. In various embodiments, the clamp 116 typically extends between 30% and 40% of the way across width W of the closing member 112. In various embodiments, the clamp 116 typically extends between 40% and 50% of the way across width W of the closing member 112. In various embodiments, the clamp 116 typically extends between 50% and 60% of the way across width W of the closing member 112. In various embodiments, the clamp 116 typically extends between 60% and 70% of the way across width W of the closing member 112.

In various embodiments, the clamp 116 is centered along width W of the closing member 112. In an alternative embodiment, the clamp 116 is not centered along width W of the closing member 112.

Figure 5:
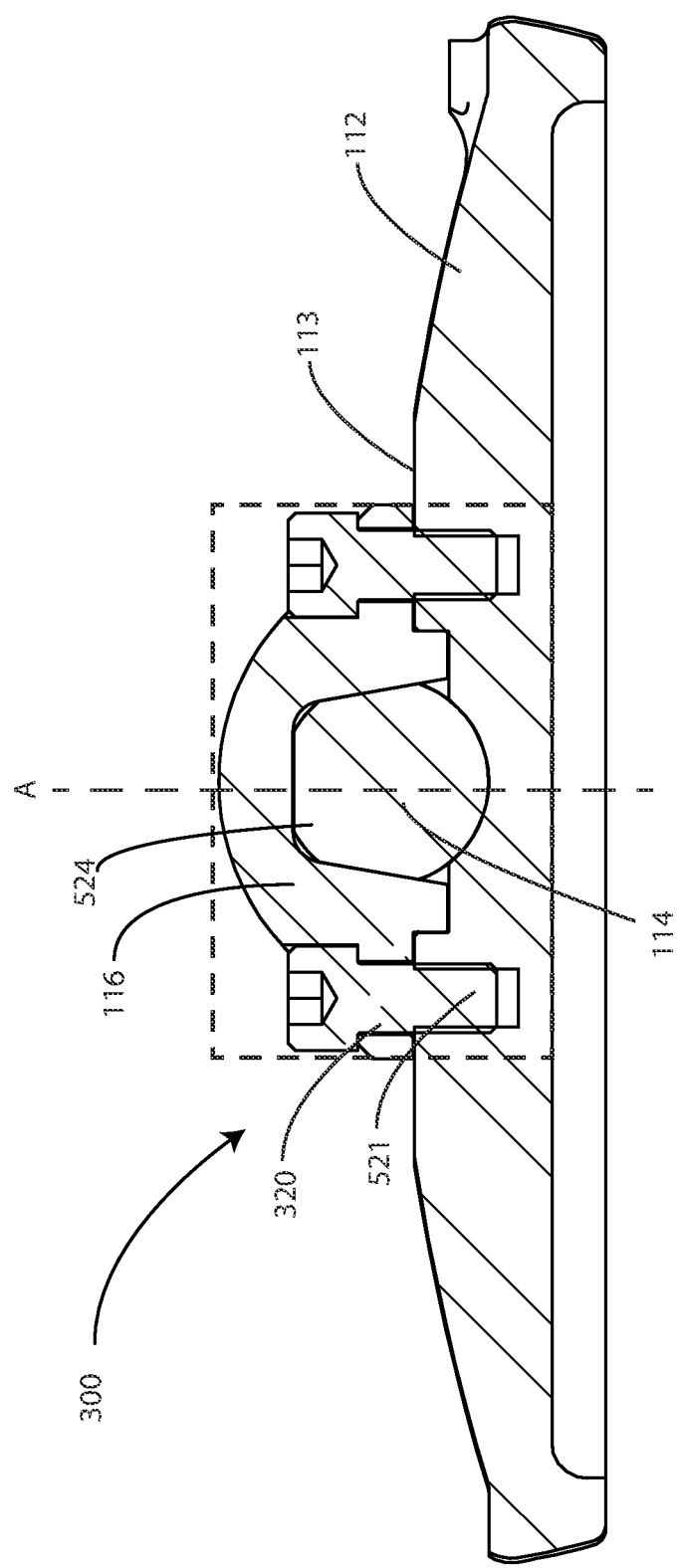
FIG. 5 is a schematic cross-sectional view of the disc, shaft and clamp assembly of FIG. 4 in accordance with various embodiments herein, taken along plane 4-4 of FIG. 5.
Figure 6:
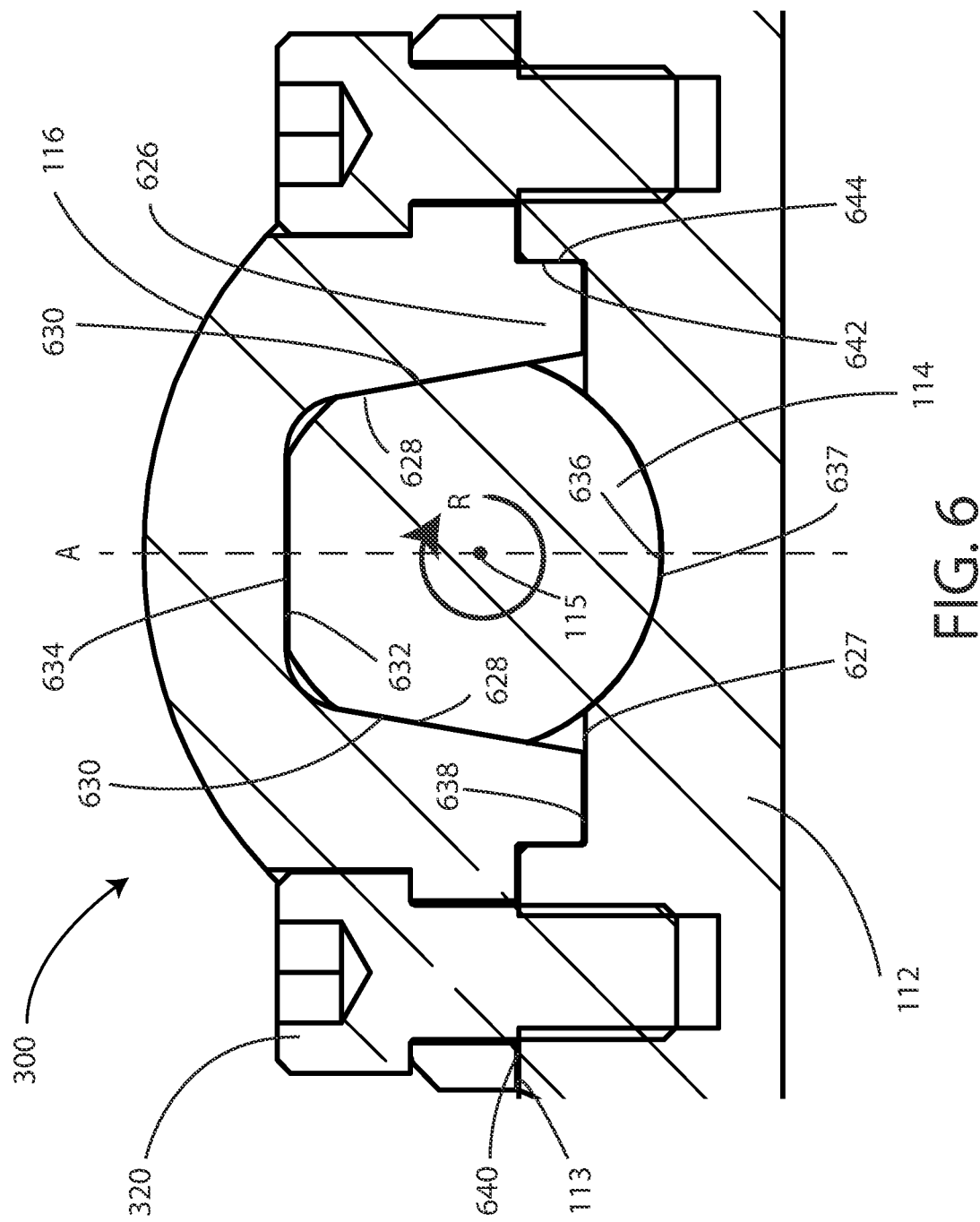
FIG. 6 is a detailed view of the disc, shaft and clamp assembly of FIG. 5.

Referring now to FIGS. 5-6, a cross-sectional view of a clamping assembly 300 taken along line 4-4 of FIG. 4 is shown in accordance with various embodiments herein.

In various embodiments the shaft 114 can have a top shaft surface 632, a bottom shaft surface 636, and two side surfaces 628. In various embodiments, the two side surfaces 628 are engagement surfaces configured to engage with the clamp 116. In an embodiment, the side engagement surfaces 628 of the shaft 114 are slanted such that when the closing member 112 is mounted to the shaft 114, the width of the shaft between the engagement surfaces 628 tapers with distance from the closing member.

In various embodiments, the clamp comprises a clamp opening 524. The clamp opening 524 can comprise clamp opening sidewalls 630 and a clamp opening top wall 634. In various embodiments, the clamp opening sidewalls 630 are configured to engage with the shaft engagement surfaces 628. In various embodiments, the clamp opening sidewalls 630 are slanted such that when the clamp 116 is mounted to the closing member 112, the width of the clamp opening 524 between the clamp opening sidewalls 630 tapers with distance from the closing member. In various embodiments the clamp 116 is constructed such that the clamp opening sidewalls 630 fit tightly around the shaft engagement surfaces 628. In various embodiments, there is no clearance between the shaft engagement surfaces 628 and the clamp opening sidewalls 630. In various embodiments, the clamp 116 is constructed to be more flexible than the shaft 114, such that the clamp opening sidewalls 630 deflect to conform to the shaft engagement surfaces 628.

In various embodiments, the clamp opening top wall 634 is configured to engage with the top shaft surface 632. In an alternative embodiment, the clamp opening top wall 634 does not engage with top shaft surface 632, forming a gap between the clamp opening top wall 634 and the top shaft surface 632.

As defined throughout the specification and in all embodiments of the disclosure, a gap is defined as an open space between one surface and another. In various embodiments, the gap between one surface and another can be less than 10 mm. In various embodiments, the gap between one surface and another can be less than 5 mm. In various embodiments, the gap between one surface and another can be less than 1 mm. In various embodiments, the gap between one surface and another can be less than ½ mm. In various embodiments, the gap between one surface and another can be greater than ½ mm. In various embodiments, the gap between one surface and another can be greater than 1 mm. In various embodiments, the gap between one surface and another can be greater than 5 mm. In various embodiments, the gap between one surface and another can be greater than 10 mm. In various embodiments, the gap between one surface and another can be greater than 25 mm. In various embodiments, the gap between one surface and another can be is typically between ½ mm and 1 mm. In various embodiments, the gap between one surface and another can be is typically between 1 mm and 5 mm. In various embodiments, the gap between one surface and another can be is typically between 5 mm and 10 mm.

The clamp can have a clamp lower face 640. In some embodiments, when mounting the closing member 112 to the shaft 114, the clamp lower face 640 is configured to engage with the closing member top face 113. In an alternative embodiment, the clamp lower face 640 does not engage with the closing member top face 113, forming a gap between the clamp lower face 640 and the closing member top face 113.

In various embodiments, the clamp has clamp legs 626 protruding from the clamp lower face 640. In various embodiments the clamp legs 626 can be retained in a closing member indentation 627 disposed in the closing member top face 113. In an embodiment, a bottom surface of the clamp legs 638 can engage the closing member indentation 627. In an alternative embodiment, the bottom surface of the clamp legs 638 do not engage with the closing member indentation 627 forming a gap between the bottom surface of the clamp legs 638 and the closing member indentation 627. In various embodiments, the closing member indentation 627 comprises indentation sidewalls 644. An outer side 642 of the clamp legs 626 can be configured to engage with the indentation sidewalls 644. In an alternative embodiment, the outer side 642 of the clamp legs 626 do not engage with the indentation sidewalls 644 forming a gap between the outer side 642 of the clamp legs 626 and the indentation sidewalls 644.

In various embodiments, the closing member indentation 627 comprises an indentation contour 637. In various embodiments, the indentation contour 637 is compatible in profile to the bottom surface of the shaft 636. In some embodiments, the indentation contour 637 is substantially cylindrical in profile. In some embodiments, the bottom surface of the shaft 636 is configured to engage with the indentation contour 637. In an alternative embodiment, the bottom surface of the shaft 636 does not engage with the indentation contour 637 forming a gap between the bottom surface of the shaft 636 and the indentation contour 637.

Numerous means of mounting the clamp 116 to the closing member 112 are imagined including but not limited to the following examples: In various embodiments, the clamp 116 can be mounted to the closing member 112 with a fastening means. In an embodiment, the clamp 116 can comprise a plurality of fasteners 320 to mate with a plurality of closing member holes 521 in the closing member 112. In an embodiment, the fasteners 320 can be slid or threaded through a plurality of holes in the clamp 116. In an embodiment, the fasteners 320 are permanently coupled to the clamp 116. In various embodiments, the fasteners apply a compressive force between the clamp 116 and the closing member 112. In an embodiment the fasteners 320 and the closing member holes 521 are threaded. In an alternative embodiment, the closing member 112 can comprise a plurality of protrusions. The protrusions can be fed through holes on the clamp 116 as the clamp is guided onto the closing member 112 and a clamping means can be placed over the protrusions to mount the clamp to the closing member. In alternative embodiment, the clamp 116 can be permanently mounted to the closing member 112 by a number of processes such as welding.

Figure 7:
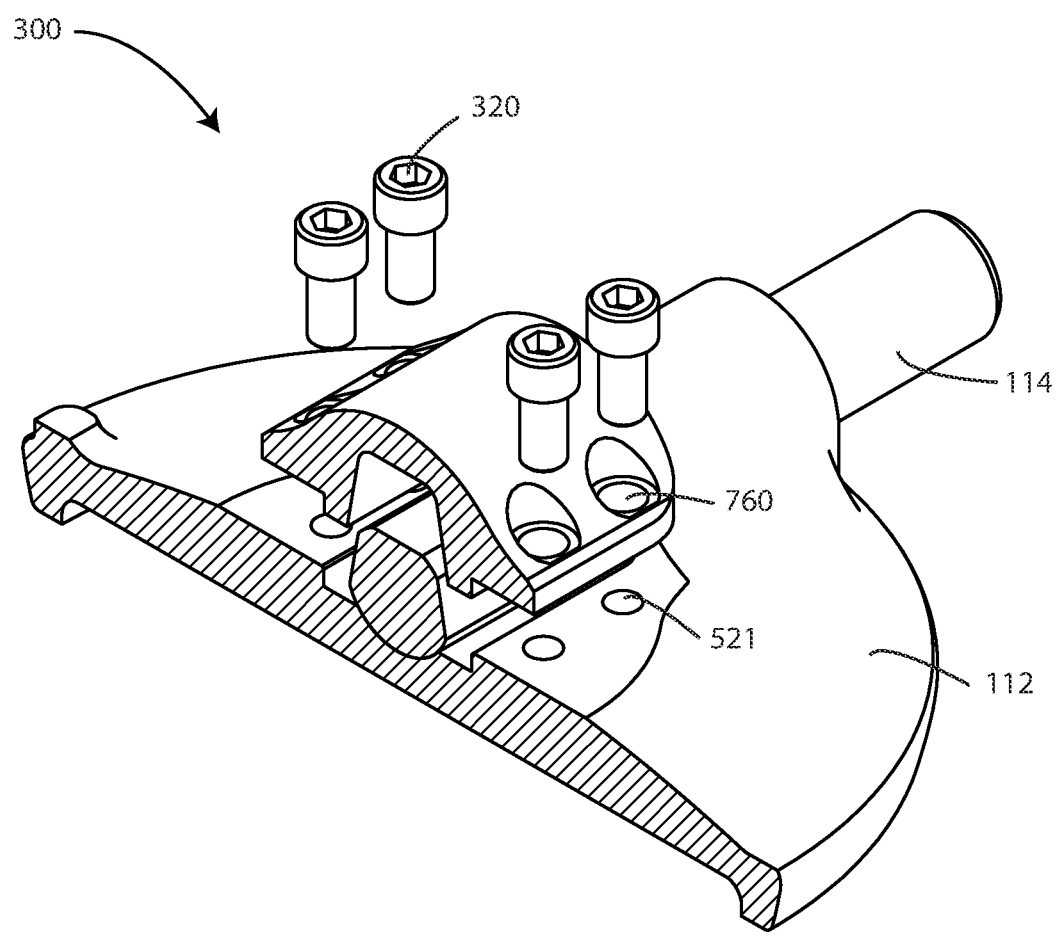
FIG. 7 is a schematic partially exploded cross-sectional view of the disc, shaft and clamp assembly of FIG. 3 in accordance with various embodiments herein.

Referring now to FIG. 7, an exploded cross-sectional view of the clamping assembly 300 is shown in accordance with various embodiments herein. In various embodiments, the clamping assembly 300 can include a shaft 114, a closing member 112, a clamp 116, and fasteners 320. In various embodiments the shaft must have a particular orientation for the clamp 116 to engage with the shaft 114. In an embodiment the top shaft surface 632 must be parallel and facing away from the closing member top face 113 for the clamp 116 to engage with the shaft 114. In an embodiment the lower face of the shaft 636 must align with the indentation contour 637 for the clamp 116 to engage with the shaft 114. With the shaft in proper alignment, the clamp can be slid over the shaft such that the clamp opening sidewalls 630 engage the side engagement surfaces 628 of the shaft 114. With the clamp 116 positioned on the closing member, a plurality of fasteners 320 can be inserted through into a plurality of clamp holes 760 into a plurality of aligned closing member holes 521.

Figure 8:
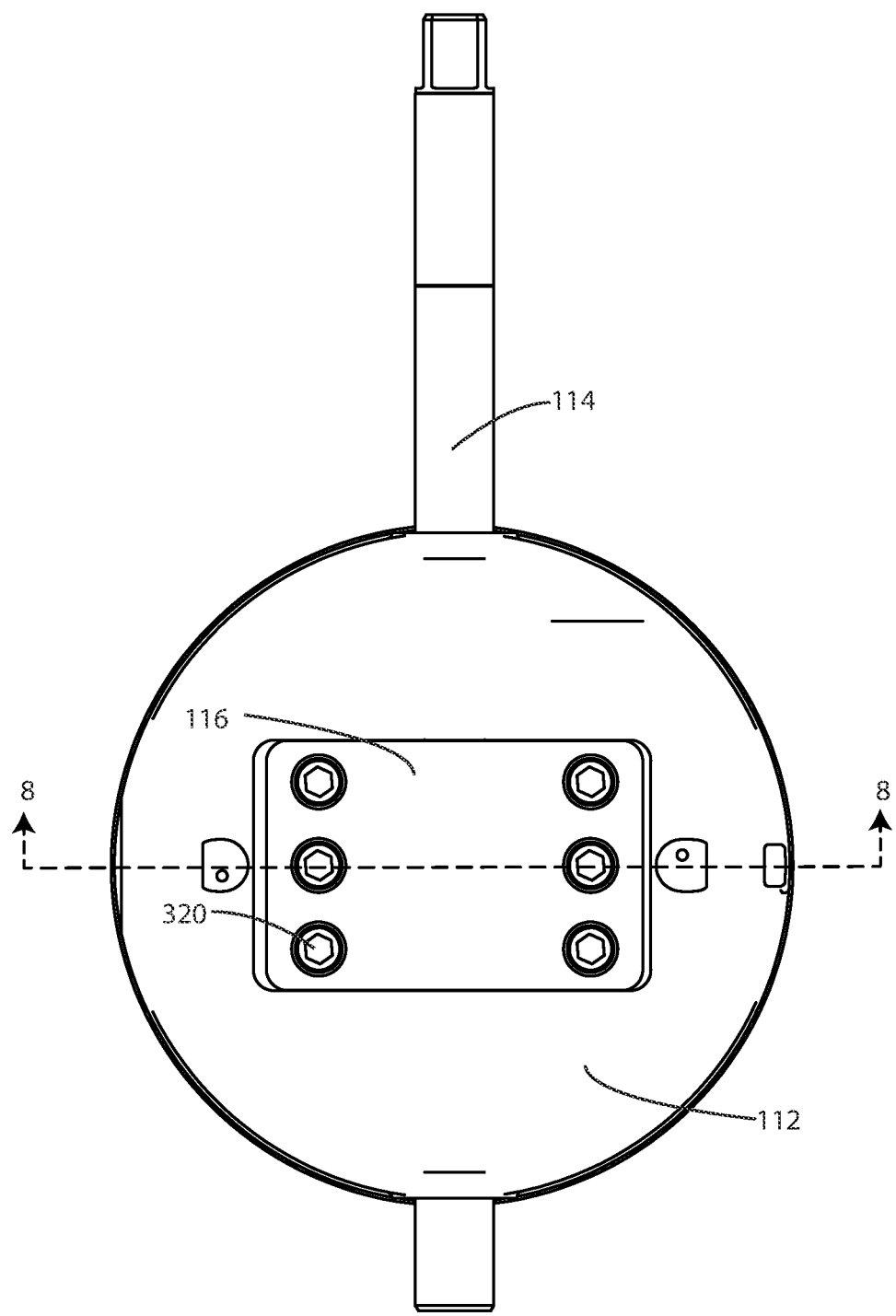
FIG. 8 is a schematic top view of a disc, shaft and clamp assembly in accordance with various embodiments herein.

FIGS. 8-11 show an alternative embodiment of a clamping assembly. Referring now to FIG. 8, a top view of a clamping assembly is shown in accordance with various embodiments herein. In various embodiments, the clamping assembly 300 can include a shaft 114, a closing member 112, and a clamp 116.

Figure 9:
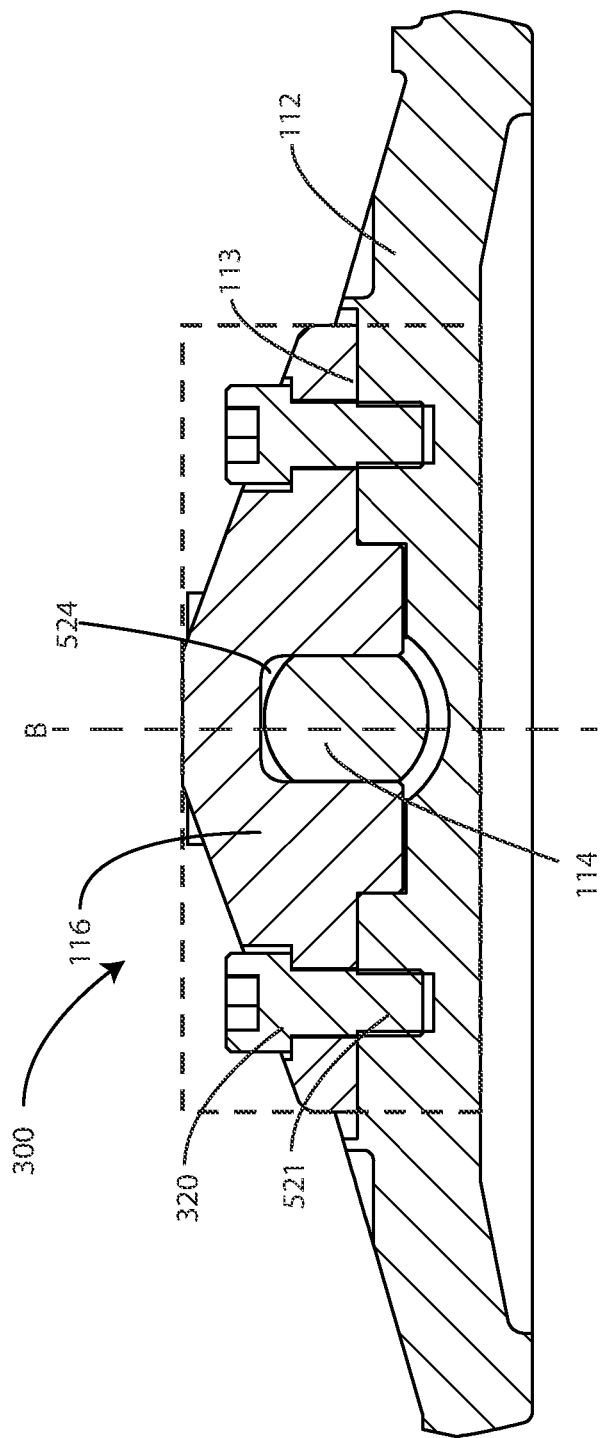
FIG. 9 is a schematic cross-sectional view of the disc, shaft and clamp assembly of FIG. 8 in accordance with various embodiments herein, taken along plane 8-8 of FIG. 8.
Figure 10:
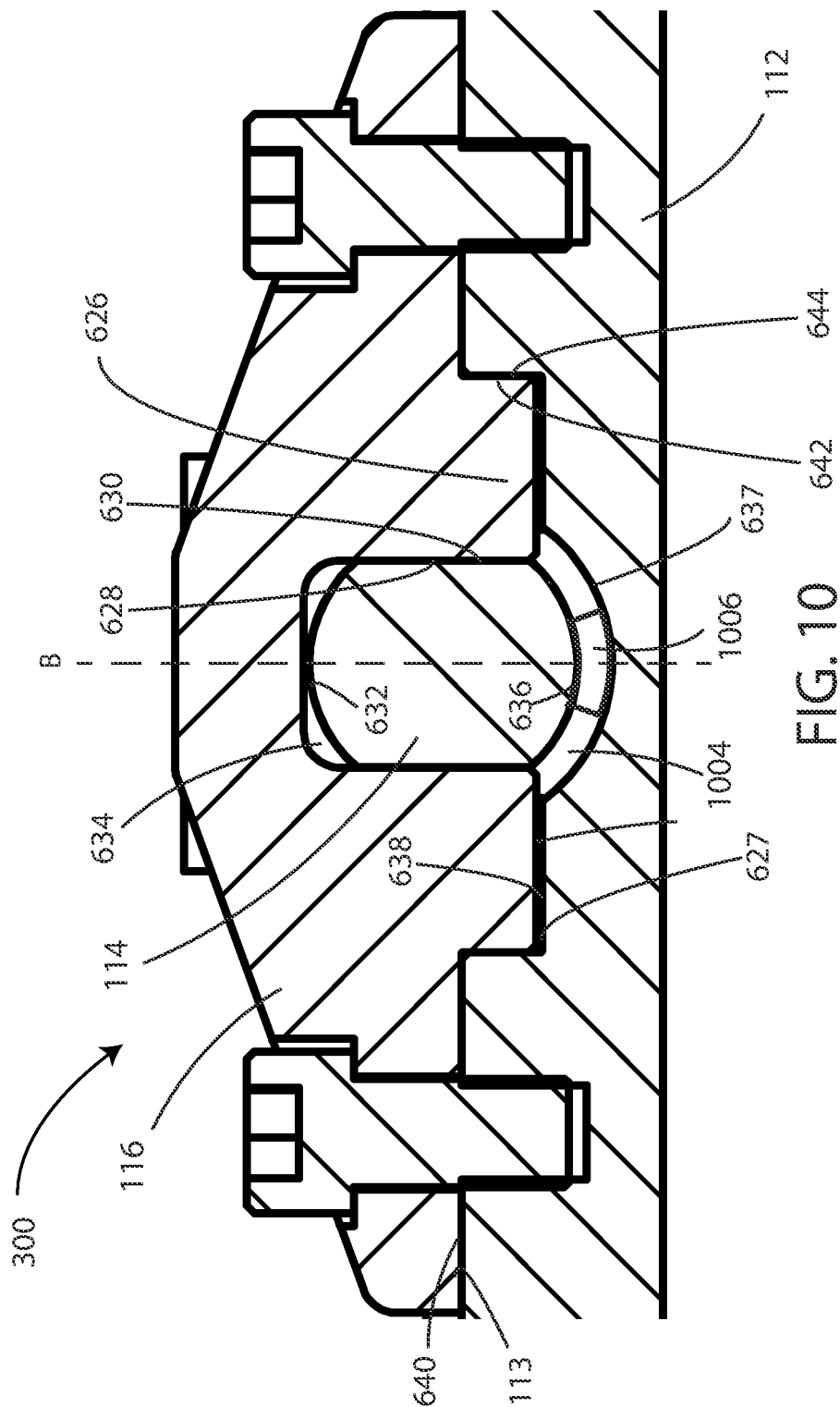
FIG. 10 is a detailed view of the disc, shaft and clamp assembly of FIG. 9.

Referring now to FIGS. 9-10, a cross-sectional view of a clamping assembly 300 taken along line 8-8 of FIG. 8 is shown in accordance with various embodiments herein. In the depicted, the clamping assembly is symmetric about plane B. For clarity, the reference numerals of symmetric features are only labeled once in FIGS. 9-10. Embodiments in which the clamping assembly is not symmetric about plane B are imaginable to those skilled in the art.

In various embodiments the shaft 114 can have a top shaft surface 632, a bottom shaft surface 636, and two side surfaces 628. In various embodiments, the two side surfaces 628 are engagement surfaces configured to engage with the clamp 116. The shaft 114 can be a Double-D shaft such that the side engagement surfaces 628 are substantially flat and make a 90 degree angle with the closing member top face 113 when the closing member 112 is mounted to the shaft.

In various embodiments, the clamp comprises a clamp opening 524. The clamp opening 524 can comprise clamp opening sidewalls 630 and a clamp opening top wall 634. In various embodiments, the clamp opening sidewalls 630 are configured to engage the with the shaft engagement surfaces 628. In various embodiments, the clamp opening sidewalls 630 are substantially flat and make a 90-degree angle with the closing member top face 113 when the closing member 112 is mounted to the shaft. In various embodiments the clamp 116 is constructed such that the clamp opening sidewalls 630 fit tightly around the shaft engagement surfaces 628. In various embodiments, there is no clearance between the shaft engagement surfaces 628 and the clamp opening sidewalls 630. In various embodiments, the clamp 116 is constructed from a more flexible material than the shaft 114, such that the clamp opening sidewalls 630 deflect to conform to the shaft engagement surfaces 628. In various embodiments, the clamp opening top wall 634 is configured to engage with the top shaft surface 632. In an alternative embodiment, the clamp opening top wall 634 does not engage with the top shaft surface 632, forming a gap between the clamp opening top wall 634 and the top shaft surface 632.

The clamp can have a clamp lower face 640. In some embodiments, when mounting the closing member 112 to the shaft 114, the clamp lower face 640 is configured to engage with the closing member top face 113. In an alternative embodiment, the clamp lower face 640 does not engage with the closing member top face 113, forming a gap between the clamp lower face 640 and the closing member top face 113.

In various embodiments, the clamp has clamp legs 626 protruding from the clamp lower face 640. In various embodiments the clamp legs 626 can be retained in closing member indentation 627 disposed in the closing member top face 113. In an embodiment, a bottom surface of the clamp legs 638 can engage the closing member indentation 627. In an alternative embodiment, the bottom surface of the clamp legs 638 do not engage with the closing member indentation 627 forming a gap between the bottom surface of the clamp legs 638 and the closing member indentation 627. In various embodiments, the closing member indentation 627 comprises indentation sidewalls 644. An outer side 642 of the clamp legs 626 can be configured to engage with the indentation sidewalls 644. In an alternative embodiment, the outer side 642 of the clamp legs 626 do not engage with the indentation sidewalls 644 forming a gap between the outer side 642 of the clamp legs 626 and the indentation sidewalls 644.

In various embodiments, the closing member indentation 627 comprises an indentation contour 637. In various embodiments, the indentation contour 637 is compatible in profile to the bottom surface of the shaft 636. In some embodiments, the indentation contour 637 is substantially cylindrical in profile. In some embodiments, the bottom surface of the shaft 636 is configured to engage with the indentation contour 637. In an alternative embodiment, the bottom surface of the shaft 636 does not engage with the indentation contour 637 forming a gap 1004 between the bottom surface of the shaft 636 and the indentation contour 637. This gap 1004 can optionally include a pad 1006 (typically formed of metal) filling part or all of the gap 1004 to help align the components, in particular during assembly.

Figure 10A:
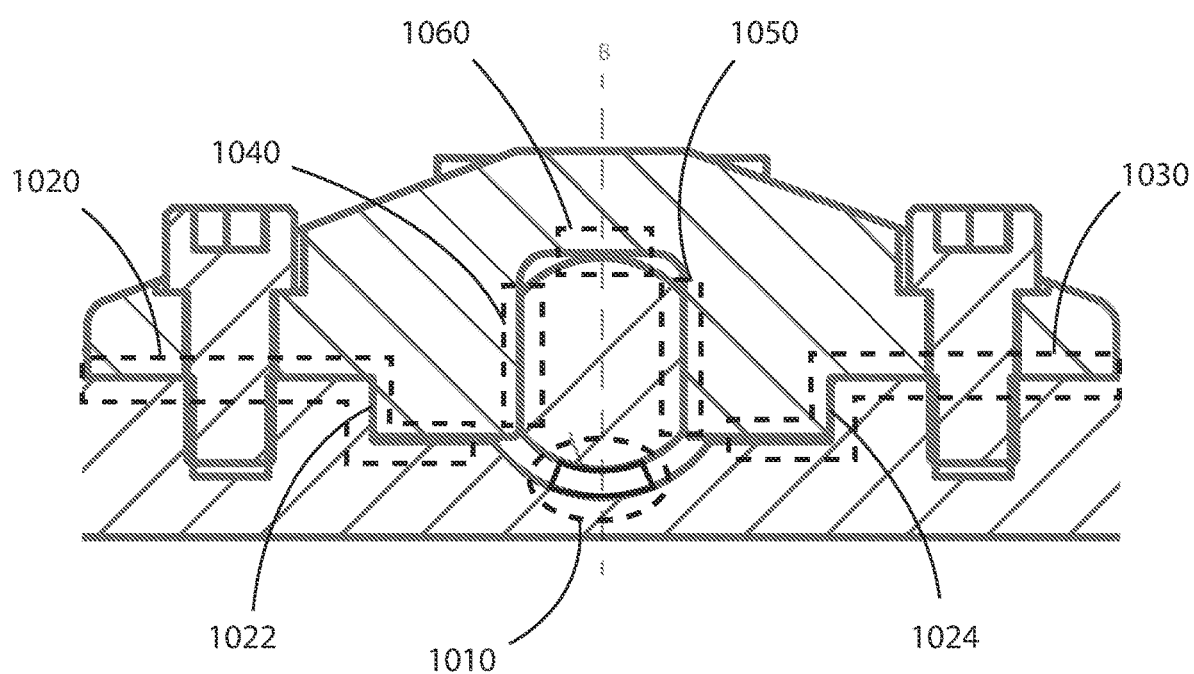
FIG. 10A is an annotated view of FIG. 10, showing various highlighted regions shown in dashed lines to indicate different regions of contact between components of the disc, shaft and clamp assembly.

FIG. 10A is an annotated view of FIG. 10, showing various highlighted areas within dashed lines to indicate different interfaces between components of the disc, shaft and clamp assembly. Although alternative embodiments are possible, in the depicted embodiment primary contact between the clamp 116, disc 112, and shaft 114 are concentrated at first interface 1020 and second interface 1030, between the clamp and the disc. Additional contact is made between the shaft 114 and clamp 116 at first side region 1040 and second side region 1050. Contact between the shaft and clamp at first side region 1040 and second side region 1050 is typically a relatively tight fit, and can be enhanced, for example, by cooling the shaft to shrink it prior to placement in the clamp recess.

However, the vertical portions of regions 1020 and 1030, indicated as interface 1022 and interface 1024, are critical gaps. These interfaces 1022 and 1024 transfer force from the clamp to the disc when force is applied to the clamp by the shaft. Thus, interface 1022 and interface 1024 generally include a small gap, and this gap is small enough that even slight deformation or movement of the clamp relative to the disc will bring them in contact with one another. For example, in FIG. 10 and FIG. 10A, if a clockwise force is applied to the shaft it can result in very small movement of the clamp relative to the disc to bring the clamp and disc in contact with one another at interface 1022, thereby providing rotational force to open or close the valve. In addition, in the depicted embodiment, there is typically a gap at region 1060 between the shaft and clamp for assembly clearance, and also gaps 1070 and 1080 on the bottom of the clamp legs for assembly clearance. A further region 1010 has gap 1004 (in some embodiments) containing optional metal pad 1006 (see FIG. 10) for shaft support. Region 1010 with gap 1004 and pad 1006 is typically present only in larger valve assemblies, and is not present or optional in smaller valve assemblies.

Figure 11:
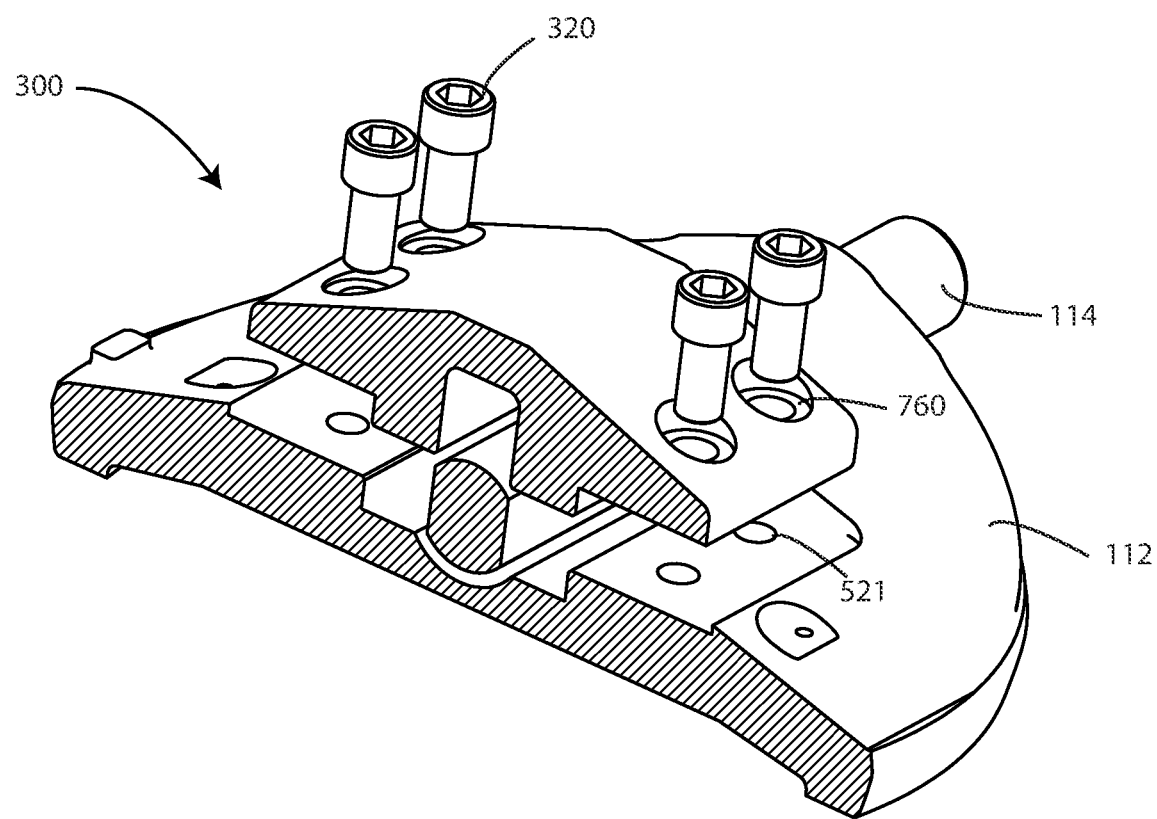
FIG. 11 is a schematic partially exploded cross-sectional view of the disc, shaft and clamp assembly of FIG. 9 in accordance with various embodiments herein.

Referring now to FIG. 11, a partially exploded cross-sectional view of the clamping assembly 300 is shown in accordance with various embodiments herein. In various embodiments, the clamping assembly 300 can include a shaft 114, a closing member 112, fasteners 320, and a clamp 116.

Force Transfer

In various embodiments, when the shaft 114 makes the rotational movement about the shaft axis 115, forces are transferred from the shaft 114 to the closing member 112 through the clamp 116 causing the closing member to rotate with the shaft. Referring back to FIG. 6, when the shaft makes the rotational movement in direction R about the shaft axis 115, the shaft engagement surface 628 to the right of plane A transfers a compressive force to the right clamp opening sidewall 630. The compressive forces exerted by the shaft 114 onto the clamp 116 in turn cause the outer surface of the right clamping leg 626 to transfer a compressive force to the right indentation sidewall 644 of the closing member 112. Those skilled in the art will appreciate that a rotational movement by the shaft 114 counter to direction R would cause an analogous transfer of forces from the shaft 114 to the closing member 112 to the left of plane A.

In various embodiments, the majority of the forces exerted by the shaft 114 are transferred to the closing member 112 through the engagement surface between an outer surface of a clamping leg 626 and the corresponding indentation sidewall 644 (or to the opposite clamp leg and indentation sidewall). In various embodiments, at least 50% of the forces exerted by the shaft 114 are transferred the closing member 112 through the engagement surface between an outer surface of a clamping leg 626 and the corresponding indentation sidewall 644. In various embodiments, at least 75% of the forces exerted by the shaft 114 are transferred the closing member 112 through the engagement surface between an outer surface of a clamping leg 626 and the corresponding indentation sidewall 644. In various embodiments, at least 90% of the forces exerted by the shaft 114 are transferred the closing member 112 through the engagement surface between an outer surface of a clamping leg 626 and the corresponding indentation sidewall 644. In various embodiments, at least 95% of the forces exerted by the shaft 114 are transferred the closing member 112 through the engagement surface between an outer surface of a clamping leg 626 and the corresponding indentation sidewall 644. In various embodiments, at least 99% of the forces exerted by the shaft 114 are transferred the closing member 112 through the engagement surface between an outer surface of a clamping leg 626 and the corresponding indentation sidewall 644.

In various embodiments, little to none of the forces are transferred from the shaft 114 to the fasteners 320 of the closing member. In various embodiments, less than 50% of the forces are transferred from the shaft 114 to the fasteners 320 of the closing member 112. In various embodiments, less than 25% of the forces are transferred from the shaft 114 to the fasteners 320 of the closing member 112. In various embodiments, less than 10% of the forces are transferred from the shaft 114 to the fasteners 320 of the closing member 112. In various embodiments, less than 5% of the forces are transferred from the shaft 114 to the fasteners 320 of the closing member 112. In various embodiments, less than 1% of the force are transferred from the shaft 114 to the fasteners 320 of the closing member 112.

In various embodiments, the fasteners 320 apply a compressive force between the clamp 116 and the closing member 112. In general, there is a gap between surfaces 638 and 627. The closing member top face 113 and clamp lower face 640 generally contact one another. Thus, a frictional force is generated between closing member top face 113 and clamp lower face 640, although this frictional force is typically less than the force transferred from clamping leg 626 and the corresponding indentation sidewall 644.

Alternatively, in some implementations, the bottom surface of clamp legs 638 and closing member indentation 627 contact one another. In this alternative design, as the shaft 114 makes the rotational movement about the shaft axis 115, a frictional force is generated between the bottom surface of the clamp legs 638 and the closing member indentation 627.

In various embodiments, the clamp 116 can slip relative to the closing member 112 as the shaft 114 makes the rotational movement about the shaft axis 115. In other embodiments, the clamp 116 does not slip relative to the closing member 112 as the shaft 114 makes its rotational movement about the shaft axis 115.

Closing Member

Figure 12:
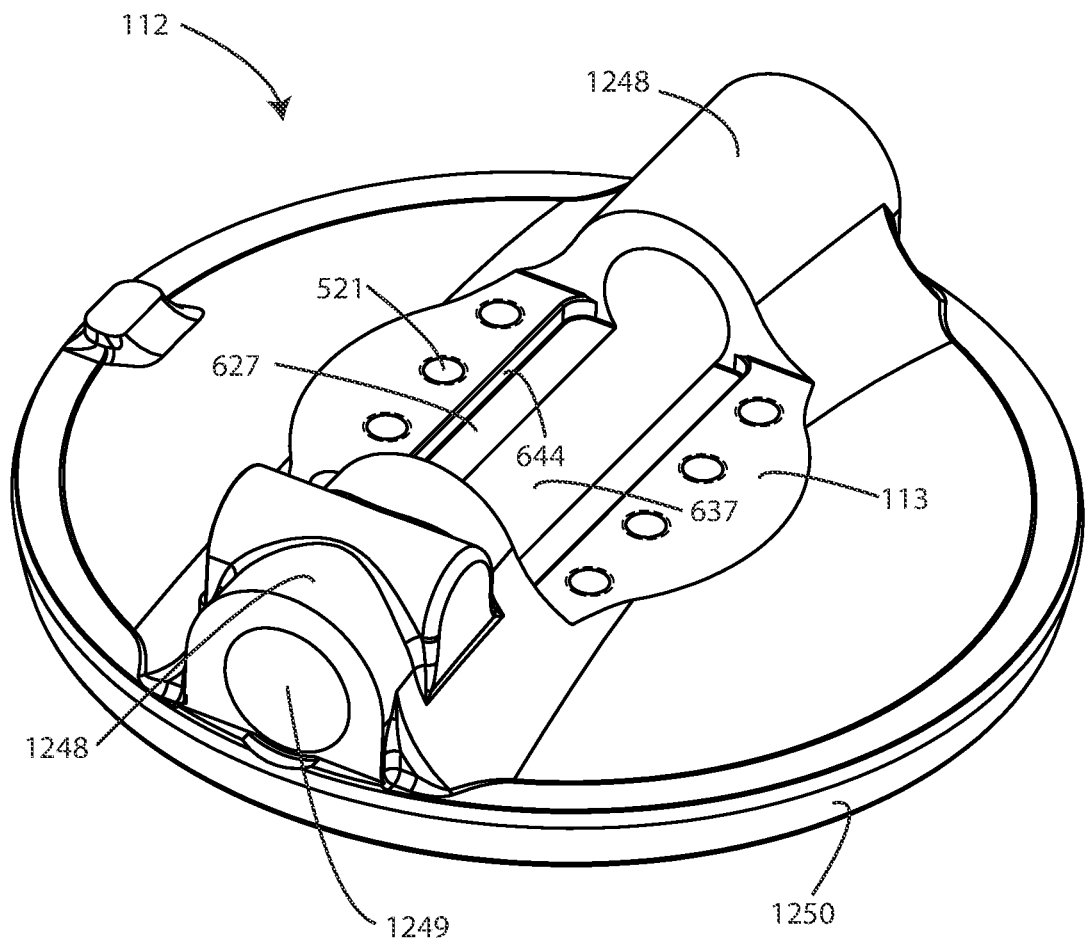
FIG. 12 is a schematic perspective view of a closing member of FIG. 1 in accordance with various embodiments herein.

Referring now to FIG. 12, a perspective view of a closing member is shown in accordance with various embodiments herein. The closing member can include one or more closed portions 1248 and a closing member indentation 627. In various embodiments, the one or more closed portions 1248 have openings 1249 to accommodate the cross-sectional shape of the shaft 114. In an embodiment, the openings 1249 of the one or more closed positions 1248 are substantially circular in cross section. In various embodiments shaft 114 can be slid through the openings 1249 of the one or more closed portions 1248. In various embodiments, the closed portions 1248 hold the shaft 114 in place as the shaft is mounted to the closing member 112 with the clamp 116. In an embodiment two closed portions 1248 are positioned on the closing member top face 113 on either side of the closing member indentation 627. In various embodiments, the closing member 112 is devoid of closed portions 1248. In one such embodiment, the indentation can extend substantially the entire length L of the closing member.

In various embodiments, at least a portion of the closing member top face 113 is configured to engage with a bottom face 640 of the clamp. In various embodiments, at least a portion of closing member top face 113 is configured to match the profile of the clamp lower face 640. In various embodiments, at least a portion of the closing member top face 113 is substantially flat in profile.

The closing member indentation 627 of the closing member 112 can include indentation sidewalls 644. In various embodiments, the indentation side walls 644 make a 90-degree angle with the bottom surface of the closing member indentation 627. In various embodiments, the indentation side walls 644 make an oblique angle with the bottom surface of the closing member indentation 627. In various embodiments, the profile of the indentation side walls 644 is formed to match the profile of the outer surfaces 642 of the clamp legs 626. In various embodiments, the profile of the indentation side walls 644 is substantially flat.

The closing member indentation 627 of the closing member 112 can include an indentation contour 637. In various embodiments, the indentation contour 637 is compatible in profile to the bottom surface of the shaft 636. In some embodiments, the indentation contour 637 is substantially cylindrical in profile. In some embodiments, the bottom surface of the shaft 636 is configured to engage with the indentation contour 637. In various embodiments, the indentation contour 637 is formed to create clearance between the shaft 114 and the indentation contour 637.

In various embodiments, the closing member 112 has one or more holes 521. In various embodiments, the one or more holes 521 are configured to receive one or more fasteners 320 of clamp 116. In various embodiments, the holes 521 are threaded. In various embodiments, the closing member 112 is devoid of holes 521.

The closing member can be formed from a number of materials including but not limited to stainless steel, optionally with a nickel overlay.

In various embodiments, closing member 112 has outer edge 1250. In various embodiments, outer edge 1250 is configured to engage with the interior face 118 of valve body 102 when the closing member is in its closed position (as depicted by FIG. 2). In various embodiments, the outer edge 1250 of the closing member and/or the interior face 118 of valve body 102 includes a sealing means to enhance the seal between the valve body 102 and the closing member 112 when the valve 100 is in its closed position.

Shaft

Figure 13:
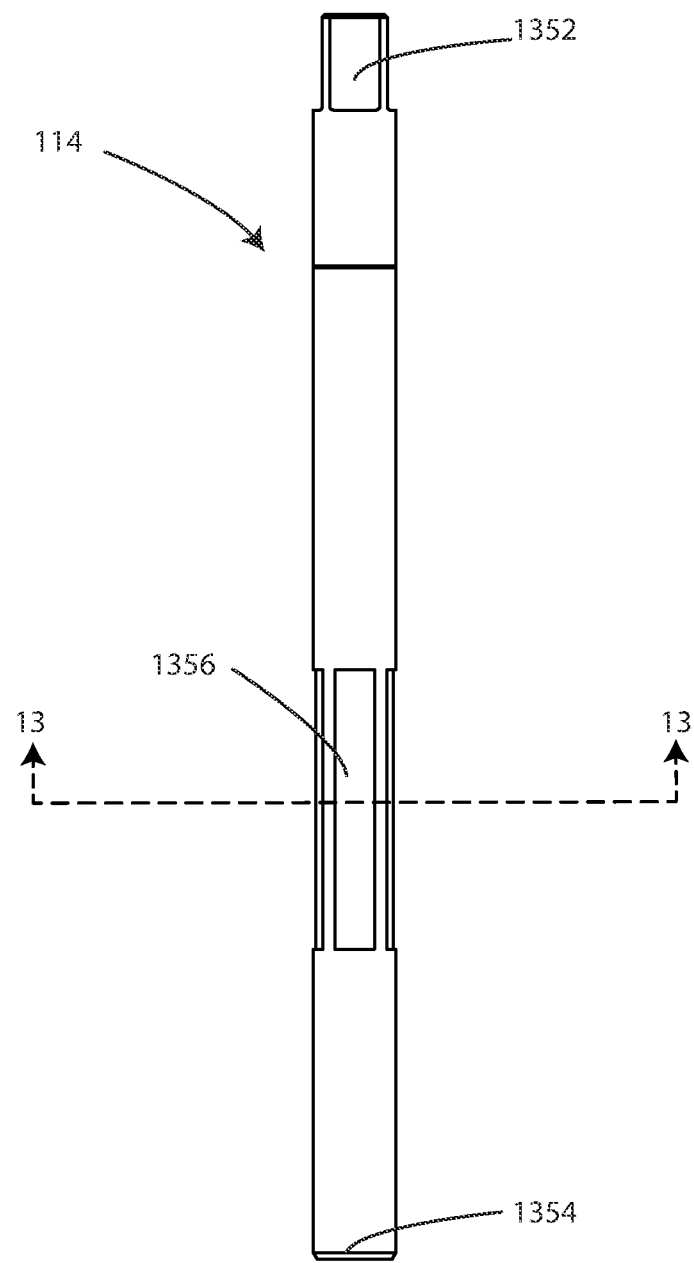
FIG. 13 is a schematic top view of a shaft in accordance with various embodiments herein.

Referring now to FIG. 13, a top view of a shaft is shown in accordance with various embodiments herein. The shaft 114 can include a top portion 1352, a bottom portion 1354, and an engagement portion 1356. In various embodiments, the top and bottom portions can be received by the valve body 102 of a valve 100. In various embodiments, the clamp 116 is configured to engage with the engagement portion 1356 of the shaft 114. In various embodiments, the shaft 114 can be substantially uniform in cross section between the engagement portion 1356 and the top portion 1352 and between the engagement portion and the bottom portion 1354. In various embodiments, the shaft 114 can be substantially circular in cross section between the engagement portion 1356 and the top portion 1352 and between the engagement portion and the bottom portion 1354. In various embodiments, the cross-sectional shape of the engagement portion 1356 of the shaft 114 differs from the cross-sectional shape of the rest of the shaft 114. In various embodiments, the cross-sectional shape of the engagement portion 1356 of the shaft is the same as the cross-sectional shape of the rest of the shaft 114.

The shaft can be made from a number of materials including but not limited to stainless steel.

Figure 14:
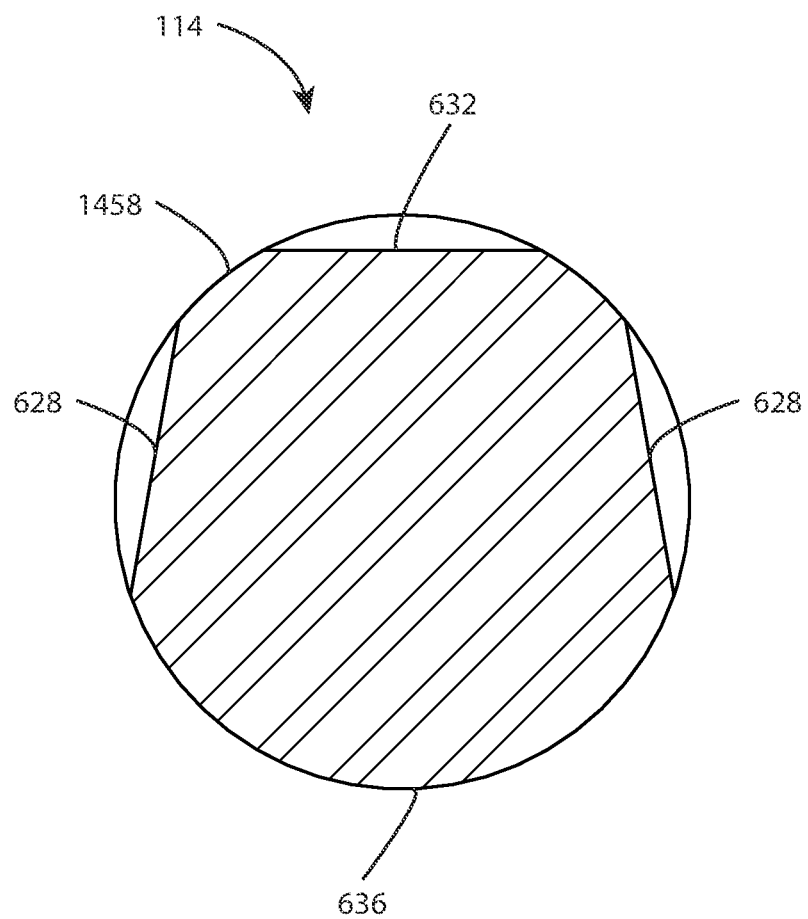
FIG. 14 is a schematic cross-sectional view of the shaft of FIG. 13 in accordance with various embodiments herein, taken along plane 13-13 of FIG. 13.

Referring now to FIG. 14, a cross sectional view of the shaft taken along section 13-13 is shown in accordance with various embodiments herein. In various embodiments the shaft 114 can comprise a top shaft surface 632, a bottom shaft surface 636, and two side surfaces 628. In various embodiments, the two side surfaces 628 are side engagement surfaces configured to engage with the clamp 116. In an embodiment, the side engagement surfaces 628 of the shaft are slanted such that when the closing member is mounted to the shaft, the width of the shaft between the engagement surfaces tapers with distance from the closing member. In an embodiment, the shaft 114 has a substantially circular profile, and the side engagement surfaces 628 are created by forming flats in opposing sides of the shaft 114. In the same embodiment, a third flat can be formed at the top shaft surface 632 in order to accommodate the clearance of the clamp 116. In the same embodiment, beveled edges 1458 can be formed between the side engagement surfaces 628 and the top shaft surface 632.

Figure 15:
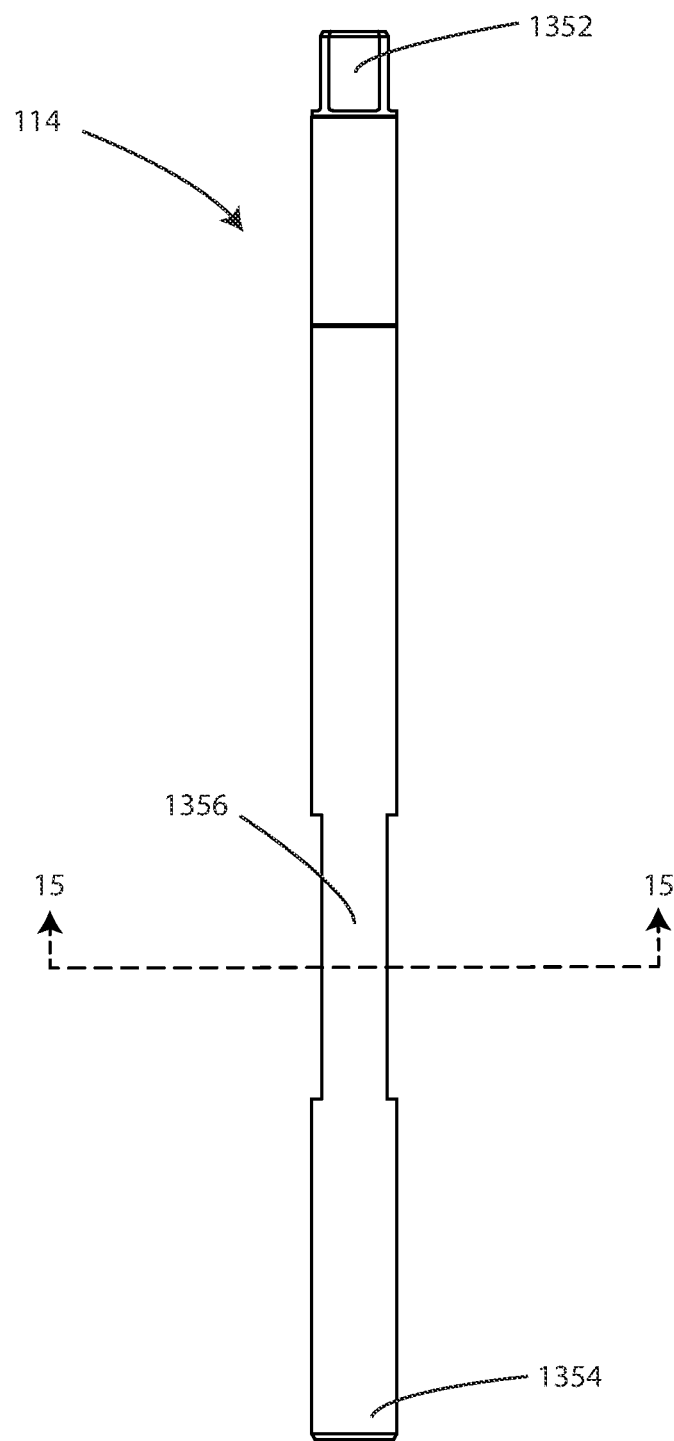
FIG. 15 is a schematic top view of a shaft in accordance with various embodiments herein.

FIG. 15 depicts an alternative version of the shaft 114 is in accordance with various embodiments herein. The shaft 114 can include a top portion 1352, a bottom portion 1354, and an engagement portion 1356.

Figure 16:
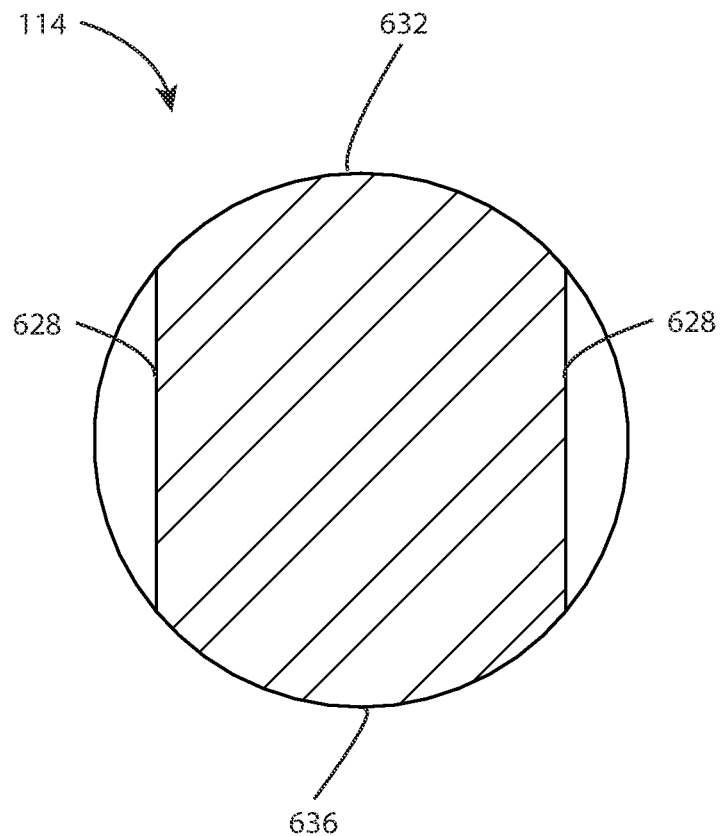
FIG. 16 is a schematic cross-sectional view of the shaft of FIG. 15 in accordance with various embodiments herein, taken along plane 15-15 of FIG. 15.

Referring now to FIG. 16, a cross sectional view of the shaft taken along section 15-15 is in accordance with various embodiments herein. In various embodiments, the shaft can have a Double-D cross section. In various embodiments, the side surfaces 628 run substantially parallel to one and other. In various embodiments, the top shaft surface 632 and the bottom surface of the shaft 636 are substantially circular in profile. Other cross-sectional shapes beyond those of FIGS. 14 and 16 are conceivable. The engagement portion 1356 of the shaft can have any cross-sectional shape capable of engaging with the clamp opening sidewalls 630. The remainder of the shaft 114 can be of any cross-sectional shape.

Clamp

Figure 17:
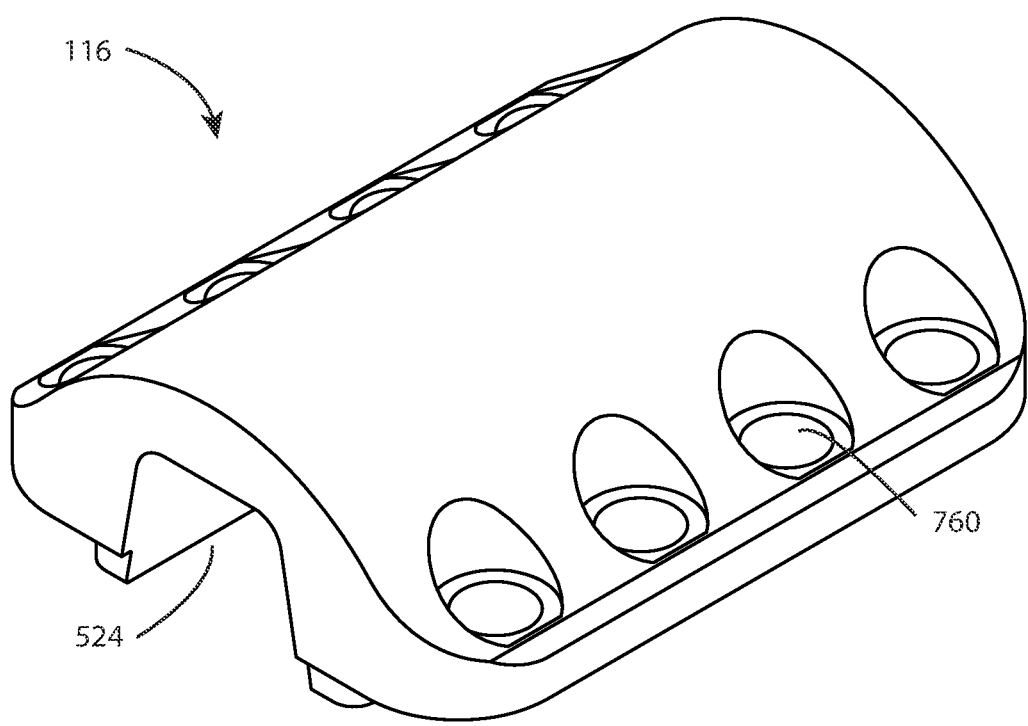
FIG. 17 is a schematic perspective view of a clamp in accordance with various embodiments herein.
Figure 18:
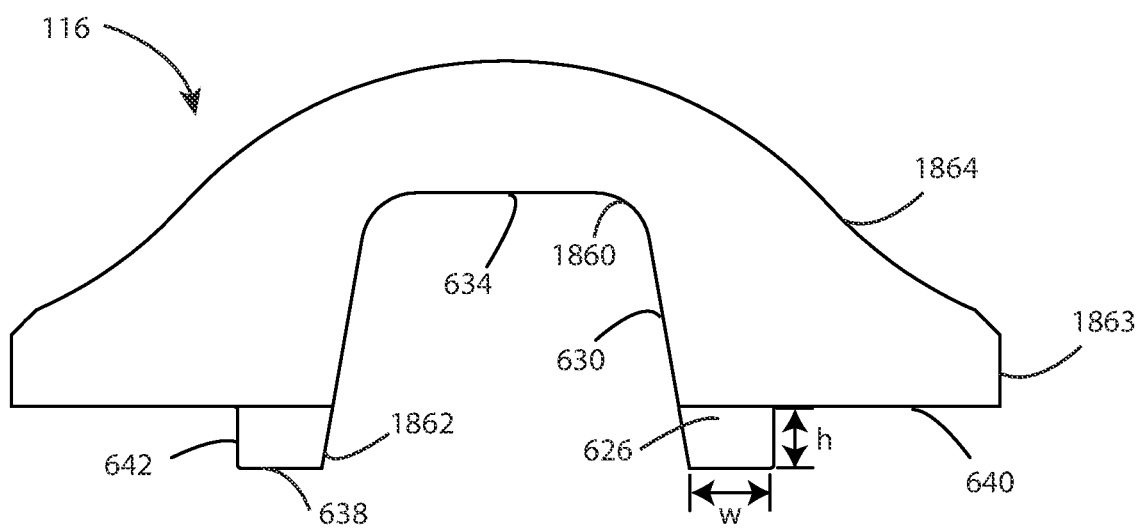
FIG. 18 is a schematic front view of the clamp of FIG. 17 in accordance with various embodiments herein.
Figure 19:
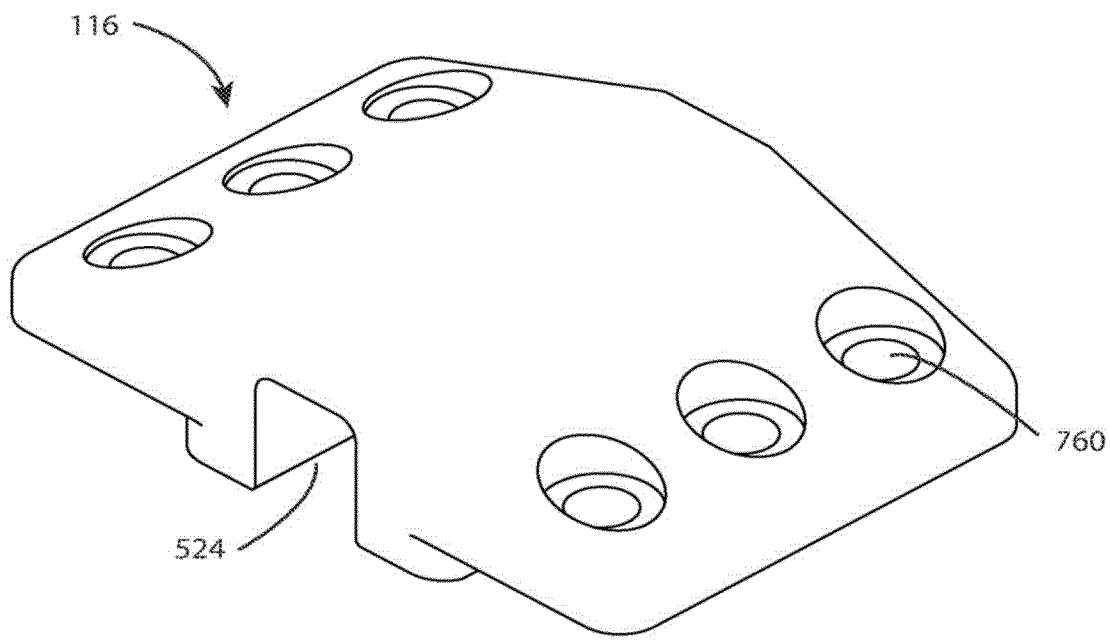
FIG. 19 is a schematic perspective view of a clamp in accordance with various embodiments herein.
Figure 20:
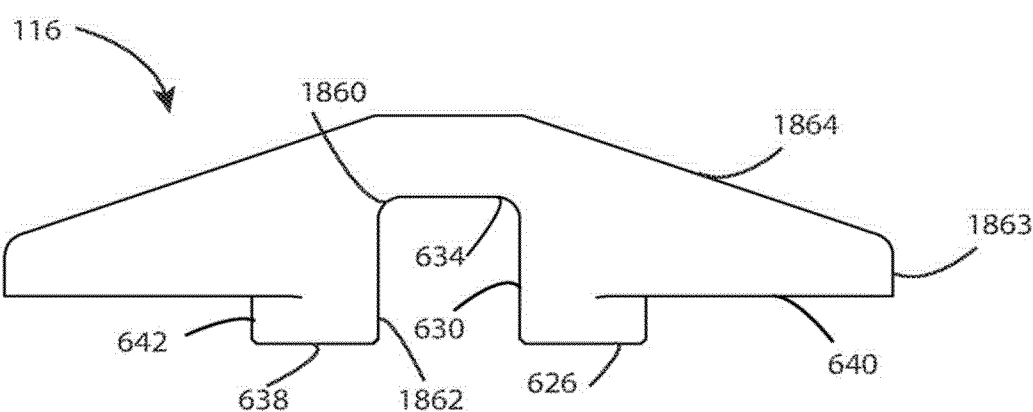
FIG. 20 is a schematic front view of the clamp of FIG. 19 in accordance with various embodiments herein.

FIGS. 17-20 show a clamp in accordance with various embodiments herein. FIGS. 17-18 show a first embodiment of a clamp. FIGS. 19-20 show a second embodiment of a clamp. Referring now to FIG. 17, a perspective view of a clamp is shown in accordance with various embodiments herein. In various embodiments, the clamp comprises a clamp opening 524 in a clamp lower face 640. The clamp opening 524 can comprise clamp opening sidewalls 630 and a clamp opening top wall 634. In various embodiments, the clamp opening sidewalls 630 are configured to engage the with the shaft engagement surfaces 628. In various embodiments, the clamp opening sidewalls 630 run parallel to one another. In various embodiments, the clamp opening sidewalls 630 are slanted such that when the clamp 116 is mounted to the closing member 112, the width of the clamp opening 524 between the clamp opening sidewalls 630 tapers with distance from the closing member. In various embodiments, the clamp opening sidewalls 630 make an oblique angle with the clamp opening top wall 634. In various embodiments, the clamp opening sidewalls 630 make a 90-degree angle with the clamp opening top wall 634. In various embodiments, there is a clamp bevel 1860 at the intersection between the clamp opening sidewalls 630 and the clamp opening top wall 634. In various embodiments the clamp 116 is constructed such that the clamp opening sidewalls 630 fit tightly around the shaft engagement surfaces 628.

The clamp can comprise a plurality of clamp holes 760 to receive a plurality of fasteners 320. In various embodiments, the fasteners 320 can be slid through the plurality of clamp holes 760. In various embodiments, the plurality of clamp holes can be threaded. In an embodiment, the fasteners 320 are permanently coupled to the clamp 116. In an embodiment, the clamp 116 is devoid of clamp holes 760.

The clamp materials can include, for example, the same materials as the disc and/or shaft. Various fastener materials can be used, including stainless steel.

Referring now to FIG. 17, a perspective view of a clamp 116 is shown in accordance with various embodiments herein. In various embodiments, the clamp 116 has clamp legs 626 protruding from the clamp lower face 640. In various embodiments both clamp legs 626 are substantially the same size. Both of the clamp legs 626 have a height h, a width w, and a length (extending into the page of FIG. 18).

In various embodiments the height h of each of the clamp legs 626 is greater than 1 mm. In various embodiments the height h of each of the clamp legs 626 is greater than 5 mm. In various embodiments the height h of each of the clamp legs 626 is greater than 1 cm. In various embodiments the height h of each of the clamp legs 626 is greater than 5 cm. In various embodiments the height h of each of the clamp legs 626 is greater than 10 cm.

In various embodiments the height h of each of the clamp legs 626 is less than 10 cm. In various embodiments the height h of each of the clamp legs 626 is less than 5 cm. In various embodiments the height h of each of the clamp legs 626 is less than 1 cm. In various embodiments the height h of each of the clamp legs 626 is less than 5 mm. In various embodiments the height h of each of the clamp legs 626 is less than 1 mm.

In various embodiments the height h of each of the clamp legs 626 is typically between 5 mm and 1 cm. In various embodiments the height h of each of the clamp legs 626 is typically between 1 cm and 2.5 cm. In various embodiments the height h of each of the clamp legs 626 is typically between 2.5 cm and 5 cm. In various embodiments the height h of each of the clamp legs 626 is typically between 5 cm and 10 cm.

In various embodiments the width w of each of the clamp legs 626 is less than 10 cm. In various embodiments the width w of each of the clamp legs 626 is less than 5 cm. In various embodiments the width w of each of the clamp legs 626 is less than 1 cm. In various embodiments the width w of each of the clamp legs 626 is less than 5 mm. In various embodiments the width w of each of the clamp legs 626 is less than 1 mm.

In various embodiments the width w of each of the clamp legs 626 is typically between 5 mm and 1 cm. In various embodiments the width w of each of the clamp legs 626 is typically between 1 cm and 2.5 cm. In various embodiments the width w of each of the clamp legs 626 is typically between 2.5 cm and 5 cm. In various embodiments the width w of each of the clamp legs 626 is typically between 5 cm and 10 cm.

In various embodiment, the length of each of the clamp legs 626 extends at least 50% of the length of the clamp 116. In various embodiment, the length of each of the clamp legs 626 extends at least 75% of the length of the clamp 116. In various embodiment, the length of each of the clamp legs 626 extends at least 90% of the length of the clamp 116. In various embodiment, the length of each of the clamp legs 626 extends substantially the entire length of the clamp 116. In various embodiment, the length of each of the clamp legs 626 extends less than 95% of the length of the clamp 116. In various embodiment, the length of each of the clamp legs 626 extends less than 90% of the length of the clamp 116. In various embodiment, the length of each of the clamp legs 626 extends less than 75% of the length of the clamp 116. In various embodiment, the length of each of the clamp legs 626 typically extends between 75% and 90% of the length of the clamp 116. In various embodiment, the length of each of the clamp legs 626 typically extends between 90% and 95% of the length of the clamp 116.

In various embodiments, the clamp legs comprise an outer side 642 and an inner side 1862. In various embodiments, the outer side of the clamping leg 626 is parallel to the inner side of the clamping leg 626. In various embodiments, the outer side of the clamping leg 626 is not parallel to the inner side of the clamping leg 626. In various embodiments, the outer side of the clamp leg is at a 90-degree angle to the clamp lower face 640. In various embodiments, the outer side of the clamp leg is at an oblique angle to the clamp lower face 640. In various embodiments, the inner sides of the clamping leg 626 are parallel to the clamp opening sidewalls 630. In various embodiments, the inner sides of the clamping leg 626 are not parallel to the clamp opening sidewalls 630. In various embodiments the outer side of the clamping leg 626 protrudes the same distance from the clamp lower face 640 as the inner side of the clamping leg 626. In various embodiments the outer side of the clamping leg 626 protrudes further from the clamp lower face 640 as the inner side of the clamping leg 626. In various embodiments the outer side of the clamp leg 626 protrudes less from the clamp lower face 640 as the inner side of the clamping leg 626.

The clamp can have an outer clamp contour 1864. In various embodiments, the outer clamp contour 1864 is smooth in profile. The outer clamp contour 1864 can have various cross-sectional shapes including but not limited to, semi-circular, semi-ellipsoidal, rectangular, and trapezoidal. In various embodiments, the outer clamp contour 1864 has a constant cross-sectional shape across the length of the clamp 116. In various embodiments, the outer clamp contour 1864 varies in cross sectional shape across the length of the clamp 116. In various embodiments, the corners of the outer clamp contour 1864 can be smoothed or rounded.

In various embodiments, the outer clamp contour 1864 comprises outer clamp edge 1863. In various embodiments, the outer clamp edge 1863 makes a 90-degree angle with the clamp lower face 640. In various embodiments, the outer clamp edge 1863 makes an oblique angle with the clamp lower face 640. In various embodiments, the height of the clamp 116 decreases from the center of the clamp to the outer clamp edge 1863. In various embodiments, the height of the clamp 116 remains constant from the center of the clamp to the outer clamp edge 1863.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

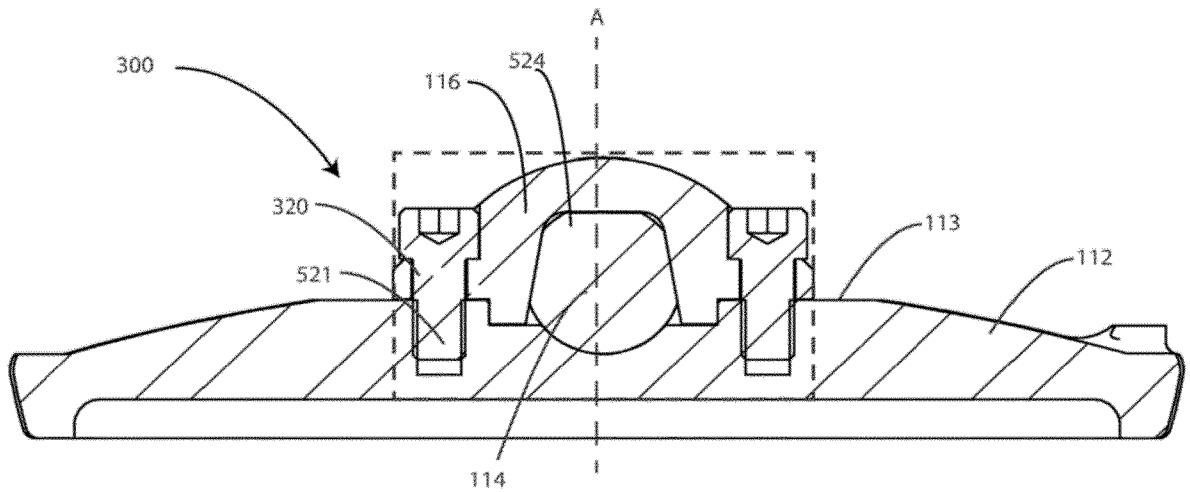

The invention claimed is:

1. A valve comprising:
   a valve body, the valve body comprising an aperture through which fluids can flow;
   a closing member configured to seal the aperture, the closing member having a top face and an indentation in the top face, the indentation comprising a first indentation sidewall and second indentation sidewall;

a shaft extending through the aperture, wherein the shaft is configured to make a rotational movement about a shaft axis, the shaft comprising a first engagement surface and a second engagement surface;

a clamp mounting the closing member to the shaft, the clamp comprising:

an opening in a lower face of the clamp, the opening having an upper surface and first and second sidewalls, the first and second sidewalls configured to engage with the first and second engagement surfaces of the shaft;

a first leg and a second leg protruding from the lower face of the clamp, the first and second legs configured to be retained in the indentation in the top face of the closing member; wherein an outer side of the first leg is configured to engage with the first indentation sidewall when the shaft makes the rotational movement in a first direction; and wherein forces exerted by the shaft as the shaft makes the rotational movement in the first direction are transferred from the first leg of the clamp to the first indentation sidewall of the closing member.

2. The valve of claim 1, wherein the closing member stays rigidly connected to the shaft as the shaft makes the rotational movement.

3. The valve of claim 1, wherein the closing member is configured to rotate from an open position in which the fluids can flow through the aperture and a closed position wherein the fluids are blocked from flowing through the aperture by the closing member.

4. The valve of claim 1, wherein the valve is a butterfly valve.

5. The valve of claim 1, wherein the clamp further comprises a plurality of fasteners configured to mate with a plurality of holes disposed within the top face of the closing member.

6. The valve of claim 5, wherein the fasteners do not substantially generate a frictional force between a closing member top face and a clamp lower face.

7. The valve of claim 1, wherein during the rotational movement of the shaft, a force is transferred from the shaft to the closing member through the clamp when the shaft makes the rotational movement.

8. The valve of claim 7, wherein force is transferred from the first and second legs of the clamp to the first and second indentation sidewalls of the closing member.

9. The valve of claim 7, wherein less than 10% of the force is transferred from the shaft to fasteners mounting the closing member to the shaft.

10. The valve of claim 1, further comprising a contact between the clamp and the top face of the closing member.

11. The valve of claim 1, the indentation of the closing member defining an indentation contour, wherein the shaft is configured to engage with the closing member indention contour.

12. The valve of claim 11, further comprising a gap containing a support pad between the shaft and the closing member indention contour.

13. The valve of claim 1, wherein the shaft is circular in cross section and the first and second engagement surfaces are created by forming flats in opposing sides of the shaft.

14. The valve of claim 13, wherein the first and second engagement surfaces of the shaft are parallel to one another.

15. The valve of claim 1, wherein the first and second engagement surfaces of the shaft are slanted such that when the closing member is mounted to the shaft, the width of the shaft between the engagement surfaces tapers with distance from the closing member.

16. The valve of claim 1, wherein a small precision gap exists between the outer side of the first clamp leg and the first indentation side wall when the shaft is not making the rotational movement in the first direction.

17. The valve of claim 1, wherein the clamp does not extend a full length of the closing member.

18. The valve of claim 1, wherein at least 75% of the forces exerted by the shaft as the shaft makes the rotational movement in the first direction are transferred from the first leg of the clamp to the first indentation sidewall of the closing member.

19. A clamp configured to mount a closing member to a shaft of a valve, the clamp comprising:

an opening within a lower face of the clamp configured to secure the shaft to the closing member, the opening comprising first and second side walls configured to engage with first and second engagement surfaces of the shaft;

a first leg and a second leg protruding from the lower face of the clamp, the first and second legs configured to be retained in an indentation in a top face of the closing member, the indentation comprising a first indentation sidewall and second indentation sidewall, wherein an outer side of the first leg is configured to engage with the first indentation sidewall when the shaft makes a rotational movement in a first direction;

wherein the outer side of the first leg and the first indentation side wall contact one another when the shaft is not making the rotational movement in the first direction; and a plurality of fasteners configured to mate with a plurality of holes disposed within the top face of the closing member.

20. A clamping assembly comprising:

a closing member configured to seal an aperture of a valve, the closing member having a top face and an indentation in the top face, the indentation comprising a first indentation sidewall and second indentation sidewall;

a shaft configured to be mounted to a body of a valve, the shaft comprising a first engagement surface and a second engagement surface, wherein the shaft is configured to make a rotational movement about a shaft axis;

a clamp mounting the closing member to the shaft, the clamp comprising:

an opening in a lower face of the clamp, the opening having an upper surface and first and second sidewalls, the first and second sidewalls configured to engage with the first and second engagement surfaces of the shaft; and a first leg and a second leg protruding from the lower face of the clamp, the first and second legs configured to be retained in the indentation in the top face of the closing member; wherein an outer side of the first leg is configured to engage with the first indentation sidewall when the shaft makes the rotational movement in a first direction; and wherein forces exerted by the shaft as the shaft makes the rotational movement in the first direction are transferred from the first leg of the clamp to the first indentation sidewall of the closing member.

* * * * *

UNITED STATES PATENT AND TRADEMARK OFFICE
CERTIFICATE OF CORRECTION

| | |
|---|---|
| PATENT NO. | : 11,879,554 B2 |
| APPLICATION NO. | : 17/704286 |
| DATED | : January 23, 2024 |
| INVENTOR(S) | : John B. Dorn et al. |

It is certified that error appears in the above-identified patent and that said Letters Patent is hereby corrected as shown below:

On the Title Page

The Title page should be delete and substitute therefor with the attached Title page, showing the corrected number of drawing sheets.

In the Drawings

Please add Figs. 19 and 20, page 19 of 19 as follows on the attached page hereto.

Signed and Sealed this
Twentieth Day of May, 2025

Coke Morgan Stewart
*Acting Director of the United States Patent and Trademark Office*

(12) United States Patent
Dorn et al.

(10) Patent No.: US 11,879,554 B2
(45) Date of Patent: Jan. 23, 2024

(54) HIGH-PERFORMANCE BUTTERFLY VALVE

(71) Applicant: DeZURIK, Inc., Sartell, MN (US)

(72) Inventors: John B. Dorn, Sauk Rapids, MN (US); Kyle M. Sand, Clearwater, MN (US); Nicholas K. Thorpe, Tacoma, WA (US); Daniel Joseph Towner, Princeton, MN (US)

(73) Assignee: DeZURIK, Inc., Sartell, MN (US)

( * ) Notice: Subject to any disclaimer, the term of this patent is extended or adjusted under 35 U.S.C. 154(b) by 0 days.

(21) Appl. No.: 17/704,286

(22) Filed: Mar. 25, 2022

(65) Prior Publication Data

US 2022/0307608 A1 Sep. 29, 2022

Related U.S. Application Data

(60) Provisional application No. 63/166,832, filed on Mar. 26, 2021.

(51) Int. Cl.
*F16K 1/22* (2006.01)
*F16K 1/48* (2006.01)

(52) U.S. Cl.
CPC . *F16K 1/48* (2013.01); *F16K 1/22* (2013.01)

(58) Field of Classification Search
CPC .............. F16K 1/22; F16K 1/222; F16K 1/48
USPC ............................................................ 251/308
See application file for complete search history.

(56) References Cited

U.S. PATENT DOCUMENTS

| 4,428,395 | A | * | 1/1984 | Bravo ............... B65D 55/14 |
| | | | | 137/364 |
| 4,817,916 | A | | 4/1989 | Rawstron |
| 5,794,647 | A | * | 8/1998 | Denmark ........... B65G 69/183 |
| | | | | 137/637.1 |
| 8,348,233 | B2 | | 1/2013 | Kim |
| 8,348,235 | B2 | | 1/2013 | Higgs |

FOREIGN PATENT DOCUMENTS

| EP | 1209390 | 2/2003 |
| EP | 2249067 | 11/2010 |
| GB | 2525372 | 10/2015 |
| GB | 2539864 | 1/2017 |
| JP | H10259877 | 9/1998 |
| JP | 2020139583 A * | 9/2020 ........... F16K 1/222 |
| KR | 20170133920 A * | 12/2017 |
| WO | 2019174685 | 9/2019 |

OTHER PUBLICATIONS

Translation of JP2020139583 (Year: 2022).*
Translation of KR20170133920 (Year: 2022).*
"DeZURIK BHP High Performance Butterfly Valves," DeZURIK Sales Bulletin 45.00-1, Jun. 2020 (22 pages).

* cited by examiner

*Primary Examiner* — Kelsey E Cary
(74) *Attorney, Agent, or Firm* — Pauly, DeVries Smith & Deffner LLC

(57) ABSTRACT

A valve design including a valve body comprising an aperture through the body is disclosed. The valve includes a shaft secured to a disc with a clamping connection.

20 Claims, 19 Drawing Sheets